(12) United States Patent
Roy et al.

(10) Patent No.: US 12,506,535 B2
(45) Date of Patent: Dec. 23, 2025

(54) MULTI-BAND HYBRID SATELLITE COMMUNICATION SYSTEMS AND METHODS

(71) Applicant: Hughes Network Systems, LLC, Germantown, MD (US)

(72) Inventors: Satyajit Roy, Gaithersburg, MD (US); George Choquette, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 304 days.

(21) Appl. No.: 18/361,390

(22) Filed: Jul. 28, 2023

(65) Prior Publication Data
US 2025/0038839 A1 Jan. 30, 2025

(51) Int. Cl.
*H04B 7/185* (2006.01)
*H04W 28/08* (2023.01)

(52) U.S. Cl.
CPC .... *H04B 7/18586* (2013.01); *H04W 28/0867* (2020.05); *H04W 28/0958* (2020.05)

(58) Field of Classification Search
None
See application file for complete search history.

(56) References Cited

U.S. PATENT DOCUMENTS

| | | | | |
|---|---|---|---|---|
| 8,341,266 B2 * | 12/2012 | Olariu | ...................... | H04L 47/24 725/95 |
| 9,642,037 B2 * | 5/2017 | Noerpel | ................ | H04W 28/12 |
| 10,405,234 B2 * | 9/2019 | Roy | ................... | H04W 28/0268 |
| 10,419,966 B2 * | 9/2019 | Xu | ........................ | H04W 40/02 |
| 2003/0016634 A1 | 1/2003 | Freedman et al. | | |
| 2016/0212031 A1 * | 7/2016 | Jain | ........................ | H04L 41/142 |
| 2018/0006949 A1 | 1/2018 | Xu et al. | | |
| 2020/0245192 A1 | 7/2020 | Roy et al. | | |
| 2021/0037419 A1 * | 2/2021 | Roy | ........................ | H04L 47/24 |
| 2021/0203410 A1 * | 7/2021 | Khan | ................ | H04B 7/18515 |
| 2021/0367891 A1 | 11/2021 | Roy et al. | | |
| 2022/0050717 A1 * | 2/2022 | Deng | .................... | G06F 9/5077 |
| 2022/0116106 A1 * | 4/2022 | Khan | .................... | H04L 1/0003 |

(Continued)

OTHER PUBLICATIONS

International Search Report and Written Opinion issued Jun. 18, 2025 in PCT/US2024/039680.

(Continued)

*Primary Examiner* — Alpus Hsu
(74) *Attorney, Agent, or Firm* — NovoTechIP International PLLC

(57) ABSTRACT

Systems and methods for outroute load balancing in a multi-band hybrid satellite communication system include comparing the load metric of each of code rate organizers (CROs) to a threshold value; placing each CRO in one of a surplus load balancing set and a deficit balancing set based on a value of the load metric; and determining a probability metric for each satellite terminal associated with each of the CROs in the surplus load balancing set. The probability metric indicates a probability of the terminal moving to one of the CROs in the deficit load balancing set. At least one satellite terminal associated with one of the CROs in the surplus load balancing set is then caused to switch to one of the CROs in the deficit load balancing set based on the probability metric of the at least one satellite terminal.

20 Claims, 17 Drawing Sheets

(56) References Cited

U.S. PATENT DOCUMENTS

2022/0121491 A1* 4/2022 Deng .................... G06F 9/5072
2023/0247484 A1* 8/2023 Sajassi ............... H04B 7/18521
370/229

OTHER PUBLICATIONS

International Search Report and Written Opinion issued Sep. 2, 2025 in PCT/US2024/039675.
Ramahatla Kebonyethebe et al: "Multiband Reconfigurable Antennas for 5G Wireless and CubeSat Applications: A Review", IEEE Access, vol. 10, Jan. 1, 2022 (Jan. 1, 2022), pp. 40910-40931.
Wang Feng et al: "Seamless Handover in LEO Based Non-Terrestrial Networks: Service Continuity and Optimization", IEEE Transactions on Communications, [Online] vol. 71, No. 2, Dec. 14, 2022 (Dec. 14, 2022), pp. 1008-1023.

* cited by examiner

MULTI-BAND HYBRID SATELLITE COMMUNICATION SYSTEMS AND METHODS

TECHNICAL FIELD

The disclosure is directed generally to satellite communication systems, and, in particular, to satellite communication systems that support multi-band capable terminals.

BACKGROUND

Modern satellite communication systems provide a robust and reliable infrastructure to distribute data across vast distances. A typical satellite communication system includes a satellite, a satellite gateway, satellite terminals, and provides connectivity to the Internet. The satellite allows traffic to be transmitted between the gateway and terminals over satellite communication links established in spot beams produced by the satellite. The links include uplinks for transmitting data to the satellite and downlinks for receiving data from the satellite. Data transmissions from a gateway to a terminal are considered in a forward direction and include a forward uplink from the gateway to the satellite and a forward downlink from the satellite to the terminal. Data transmissions from a terminal to a gateway is considered in a return direction and include a return uplink from the terminal to the satellite and a return downlink from the satellite to the gateway. A forward link is also referred to as an outroute, and a return link is also referred to as an inroute. Satellite communication links can be implemented in various frequency bands, such as C, Ku, Ka, Q, V. etc. Each band defines the frequency range used for data transmission. In general, higher frequency bands are more susceptible to rain and weather attenuation but provide higher throughput. Satellite terminals have typically been configured as single-band terminals that transmit and receive data in a single frequency band.

While current satellite communication systems and methods are effective, satellite terminals capable of operating in multiple frequency bands are being developed. Finding ways to leverage this capability to extend capacity and increase throughput for satellite systems are needed.

SUMMARY

In one general aspect, the instant disclosure presents a data processing system having a processor and a memory in communication with the processor wherein the memory stores executable instructions that, when executed by the processor alone or in combination with other processors, cause the data processing system to perform multiple functions. The functions may include determining a current congestion level of code rate organizers (CROs) of the load balancing system; determining a load metric of each of the CROs, the load metric that is determined being different for different congestion levels of the CROs; comparing the load metric of each of the CROs to a threshold value; when the load metric of a CRO is greater than the threshold value, placing the CRO in a surplus load balancing set; when the load metric of the CRO is less than the threshold value, placing the CRO in a deficit load balancing set; determining a probability metric for each satellite terminal associated with each of the CROs in the surplus load balancing set, the probability metric indicating a probability of the terminal moving to one of the CROs in the deficit load balancing set; and causing at least one satellite terminal associated with one of the CROs in the surplus load balancing set to switch to one of the CROs in the deficit load balancing set based on the probability metric of the at least one satellite terminal.

In yet another general aspect, the instant disclosure presents a method for outroute load balancing in a multi-band hybrid satellite communication system. The method includes determining a current congestion level of code rate organizers (CROs) of the load balancing system; determining a load metric of each of the CROs, the load metric that is determined being different for different congestion levels of the CROs; comparing the load metric of each of the CROs to a threshold value; placing each CRO in one of a surplus load balancing set and a deficit balancing set based on a value of the load metric; determining a probability metric for each satellite terminal associated with each of the CROs in the surplus load balancing set, the probability metric indicating a probability of the terminal moving to one of the CROs in the deficit load balancing set; and causing at least one satellite terminal associated with one of the CROs in the surplus load balancing set to switch to one of the CROs in the deficit load balancing set based on the probability metric of the at least one satellite terminal.

In a further general aspect, the instant application describes a non-transitory computer readable medium on which are stored instructions that when executed cause a programmable device to perform functions of determining a current congestion level of code rate organizers (CROs) of a load balancing system; determining a load metric of each of the CROs, the load metric that is determined being different for different congestion levels of the CROs; comparing the load metric of each of the CROs to a threshold value; when the load metric of a CRO is greater than the threshold value, placing the CRO in a surplus load balancing set; when the load metric of the CRO is less than the threshold value, placing the CRO in a deficit load balancing set; determining a probability metric for each satellite terminal associated with each of the CROs in the surplus load balancing set, the probability metric indicating a probability of the terminal moving to one of the CROs in the deficit load balancing set; and causing at least one satellite terminal associated with one of the CROs in the surplus load balancing set to switch to one of the CROs in the deficit load balancing set based on the probability metric of the at least one satellite terminal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Multi-band hybrid satellite operations present a number of technical problems that must be taken into consideration in system design and implementation. For example, different terminal communication configurations are possible. A terminal may be configured to have multi-band in the forward direction and single band in the return direction, multi-band in both directions, multi-band in the return direction and single band in the forward direction, and single band in both directions. As another example, the use of different frequency bands introduces a number of factors that must be taken into consideration in all aspects of a satellite communication system from terminal installation and commissioning to load balancing, and beam switching. For example, the following factors must be taken into consideration:

Ka and Q-bands have much different rain attenuation properties that can affect terminals to a great extent;

Not all terminals will be multi-band capable, many will be Ka-only. Therefore, the system needs to support hybrid population of terminals with respect to the frequency bands of operation in the same network;

There are various beam overlapping and beam switching scenarios, such as two adjacent and/or overlapping beams have the same or different frequency band capabilities;

The system may not have the same capacity for different frequency bands in a given beam;

The attenuation through the satellite (and gateway) might differ for different frequency bands; and The impact on a system of using different frequency bands having different properties for outroute and inroute.

To address these technical problems and more, in an example, this description provides technical solutions in the form of systems and methods for implementing a multi-band hybrid satellite communication system that take the factors and problems mentioned above into consideration. Aspects of the disclosure are directed to system configurations and algorithms that facilitate installation and commissioning of multi-band terminals, outroute load balancing, differentiated service, mobility, dynamic inroute and outroute creation, hybrid receive and transmit bands, and multi-satellite operation.

Figure 1:
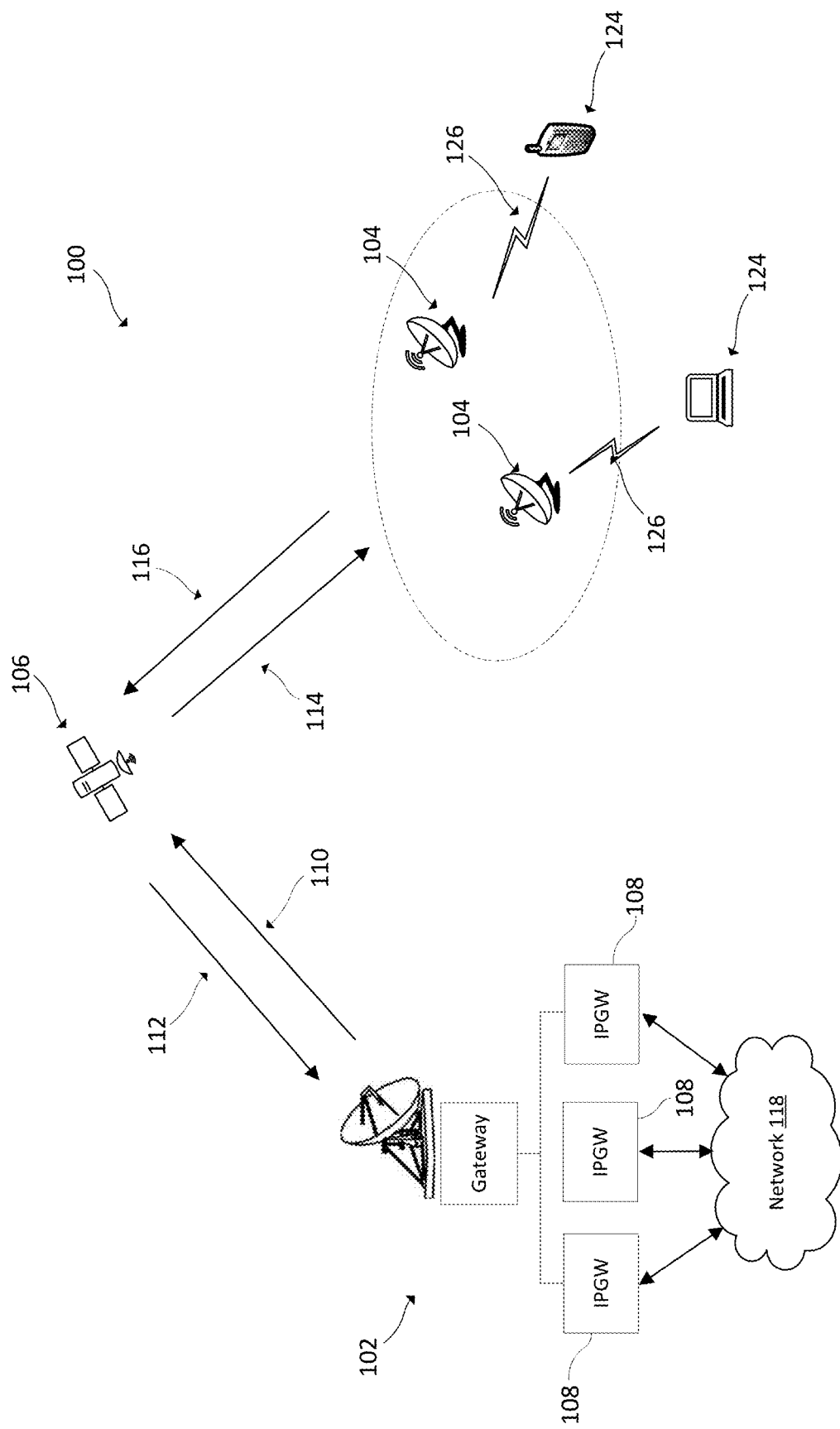
FIG. 1 shows an example multi-band hybrid satellite communication system upon which aspects of this disclosure may be implemented.

FIG. 1 is a simplified diagram of an exemplary satellite communication system 100 in which the systems and methods disclosed herein may be implemented. Satellite communications system 100 includes a satellite 106, a satellite gateway 102, and satellite terminals 104. Satellite 106 may be any suitable type of communications satellite, such as a bent-pipe design geostationary satellite, which is capable of supporting data transmission in multiple frequency bands, such as C, Ku, Ka, Q, V, etc.

Satellite gateway 102 includes an antenna, transceiver, and baseband equipment for enabling communication with satellite terminals 104 via the satellite 106. Gateway 102 also includes one or more Internet Protocol Gateways (IP-GWs) 108 that provide connectivity to ground telecommunications infrastructures, such as, for example, network 116. Network 116 includes one or more wired and/or wireless networks, such as, for example, the Internet, a wide-area network (WAN), a local-area network (LAN), and/or any other type of network.

In embodiments, satellite terminals 104 may be, for example, very small aperture terminals (VSATs) that connect to the network 118 through satellite 106 and satellite gateway 102. For example, satellite terminals 104 may be used at a residence or place of business to provide a user with access to the Internet. Satellite terminals 104 include an outdoor unit (ODU) that includes an antenna, such as a satellite dish for receiving RF signals from and transmitting RF signals to satellite 106, and an indoor unit (IDU), such as a set-top box or similar type of equipment, that includes a transceiver, a controller, memory, a local server, and other types of equipment (not shown) which enable communication with satellite 106 and gateway 102. Satellite terminals 104 enable client devices 124, such as computers, smart phones, tablets, televisions, and the like, to connect to the network 118 via the satellite communication system.

Gateway 102 communicates with satellite terminals 104 using communication channels established via beams (e.g., spot beams) emitted by the satellite. Communication channels include a feeder link between the gateway and satellite and user links between satellite terminals and the satellite. Feeder links include a forward uplink 110 for transmitting data from gateway 102 to satellite 106 and a return downlink 112 for transmitting data from the satellite 106 to the gateway 102. User links include a forward downlink 114 for transmitting data from the satellite 106 to the satellite terminals 104 and a return uplink 116 for transmitting data from satellite terminals 104 to satellite 106. The forward uplink 110 and the forward downlink 114 together form an outroute channel, and the return uplink link 116 and the return downlink 112 together form an inroute channel.

Data from the network 116 intended for a satellite terminal 104 may be in the form of IP packets, including TCP packets and UDP packets, or any other suitable IP packets. IP packets enter gateway 102 via an IPGW 108. IP packets from the IPGWs 108 are processed and multiplexed before being forwarded to priority queues at the gateway 102 and scheduled for transmission. The IP packets are then transmitted to the satellite 106 on the outroute channel 110, 114. IP packets from client devices 124 may be received at a satellite terminal 104 and transmitted to the gateway 102 via inroute channel 116, 112.

Satellite terminals 104 may be equipped with the appropriate antenna(s) and RF equipment to enable multi-band operation in the user links 114, 116 in one or both of the forward direction and the return direction. In particular, satellite terminals 104 may be configured to have multi-band operation in the forward direction (i.e., forward downlink 114) with single-band operation in the return direction (i.e., return uplink 116), multi-band operation in both directions, multi-band operation in the return direction with single-band operation in the forward direction, and single-band operation in both directions. Multiple band operation can be supported by one satellite having multiple bands on the user link, or by multiple satellites having different frequency bands on the user link. For the purposes of this disclosure, two frequency bands, the Ka and Q frequency bands, are used for describing the concepts disclosed herein. However, the systems and methods described herein are applicable to other frequency bands and to more than two frequency bands.

In addition to having the appropriate hardware for multi-band operation, satellite terminals 104 may require configuration and software modifications to facilitate multi-band operation. These changes may be implemented in the installation and commissioning processes for the terminal. During the installation process of a VSAT, for example, the VSAT is loaded with a configuration file, also called a Satellite Based Commissioning file (sbc.cfg file), which defines various operating parameters for the VSAT, such as a domain name system (DNS) and timers, antenna type/model, antenna size, RF power, and the like. The configuration file also includes beam definitions for each beam in the system. These beams can be from one satellite or multiple satellites. As one of the parameters, a beam definition lists all the frequency bands supported by the beam.

To facilitate the install/commissioning process, the configuration file also includes hardware type/model which specifies whether the IDU of a satellite terminal is capable of single-band operation only (e.g., Ka-only) or multi-band operation (e.g., Ka/Q). The install process therefore can be adapted automatically with either a Ka-only install or a Ka/Q install process as needed. The IDU can at least provide confirmation to an installer regarding the configuration of the equipment.

Satellite terminals, or VSATs, in the same beam coverage area may have different multi-band capabilities. For example, some VSATs in a spot beam may be capable of only single-band operation, e.g., Ka only, while other VSATs in the spot beam may be capable of dual-band operation, e.g., Ka and Q bands. The IDU (Indoor Unit) of a VSAT can determine the radio model (either Ka-only or both Ka and Q) electronically or otherwise through the installer manual entry. Therefore, the install process adapts automatically accordingly either with a Ka-only install or a Ka/Q install process as applicable. The IDU of VSAT confirms with the installer about the type of radio being discovered.

Each outroute from a gateway advertises all the available outroutes of each band within the scope of a beam, not just its own band, and indicates the band (e.g., frequency band) of each outroute. Additionally, in the event that the system has a Q-band outroute and Ka-band inroutes, or multiple inroute bands, the gateway indicates or advertises the band applicable for an inroute set/group and the system automatically picks the right band for the VSAT install. In embodiments, a network might have the same sbc.cfg file in all IDUs. For example, a network might not issue separate IDU part numbers/sbc files if the radio is going to be dual band vs Ka-only. Therefore, the IDU shall only look at outroutes which it can use based on what hardware/radio is determined during the installation process.

One of the outroutes in a beam is typically designated an anchor outroute which is used to broadcast any upcoming outroutes size changes, and after the resizing, to broadcast the information of new resized outroutes. For a single-band install, when the anchor outroute specified in a configuration file does not match the band supported by the IDU hardware, an installer can be alerted, e.g., by displaying a message on a display screen associated with the terminal. In embodiments, the install screen presents the installer with a menu to pick other outroutes which match the band supported by the hardware.

Figure 2:
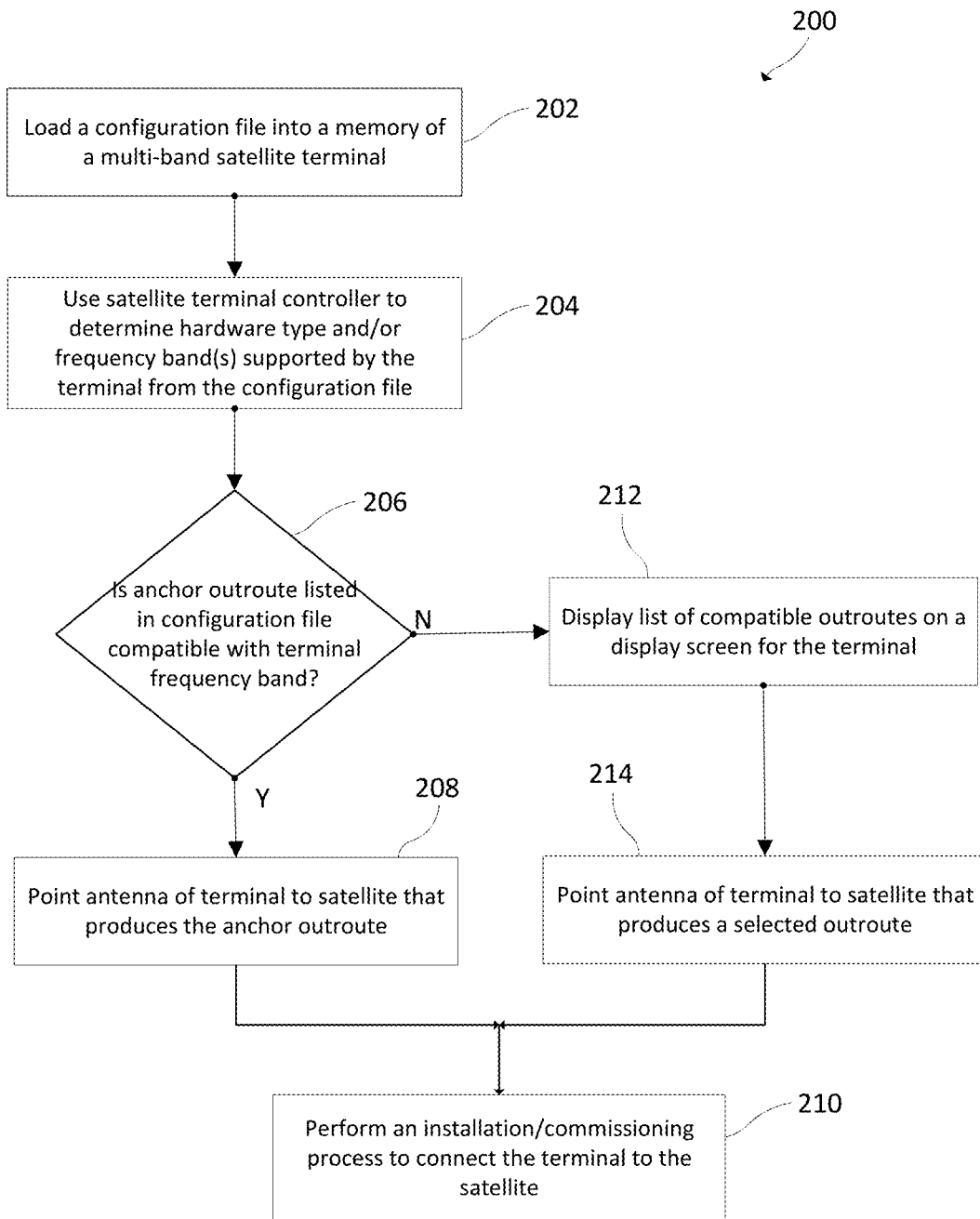
FIG. 2 is a flowchart of an example method for commissioning a satellite terminal for a multi-band hybrid satellite communication system, such as the satellite communication system of FIG. 1.

A flowchart depicting an example single band installation/commissioning process 200 is shown in FIG. 2. The method begins with loading a configuration file into a memory of a multi-band satellite terminal (block 202). The satellite terminal controller reads the configuration file to identify the hardware type in order to determine the frequency band(s) supported by terminal (block 204). A determination is then made as to whether the frequency band of the terminal is compatible with an anchor outroute listed in the configuration file (e.g., sbc.cfg file) (block 206). If the terminal is compatible with the anchor outroute, the antenna of the terminal is directed to the satellite that produces the beam for the anchor outroute (block 208). The antenna of the terminal is pointed at the satellite and an installation/commissioning process is carried out to connect the terminal to the satellite (block 210). If the frequency band of the anchor outroute is not compatible with the terminal, a list of compatible outroutes is displayed on a display screen for the terminal (block 212). The list of outroutes may be included in the configuration file (e.g., sbc.cfg). An installer can select an outroute from the list. The antenna of the terminal is pointed at the selected satellite (block 214), and an installation/commissioning process is carried to connect the terminal to the satellite (block 210).

In embodiments, a dual band install process may access the Ka band outroute first, even if it is not the first anchor outroute, because Ka band is less susceptible to being impacted by rain and therefore may be more likely to be received in any given situation which increases the likelihood of a successful install. Furthermore, the dual-band install process might check workability of both Ka and Q-bands, and not just latch for good onto the first anchor outroute. As a result, in later operation the system knows which band to use. In the event multiple bands have different polarization and the VSAT supports an automated electronic or mechanical polarization switching, the VSAT controller knows to switch to the right polarization each time a band change necessitates a polarization change.

Figure 3:
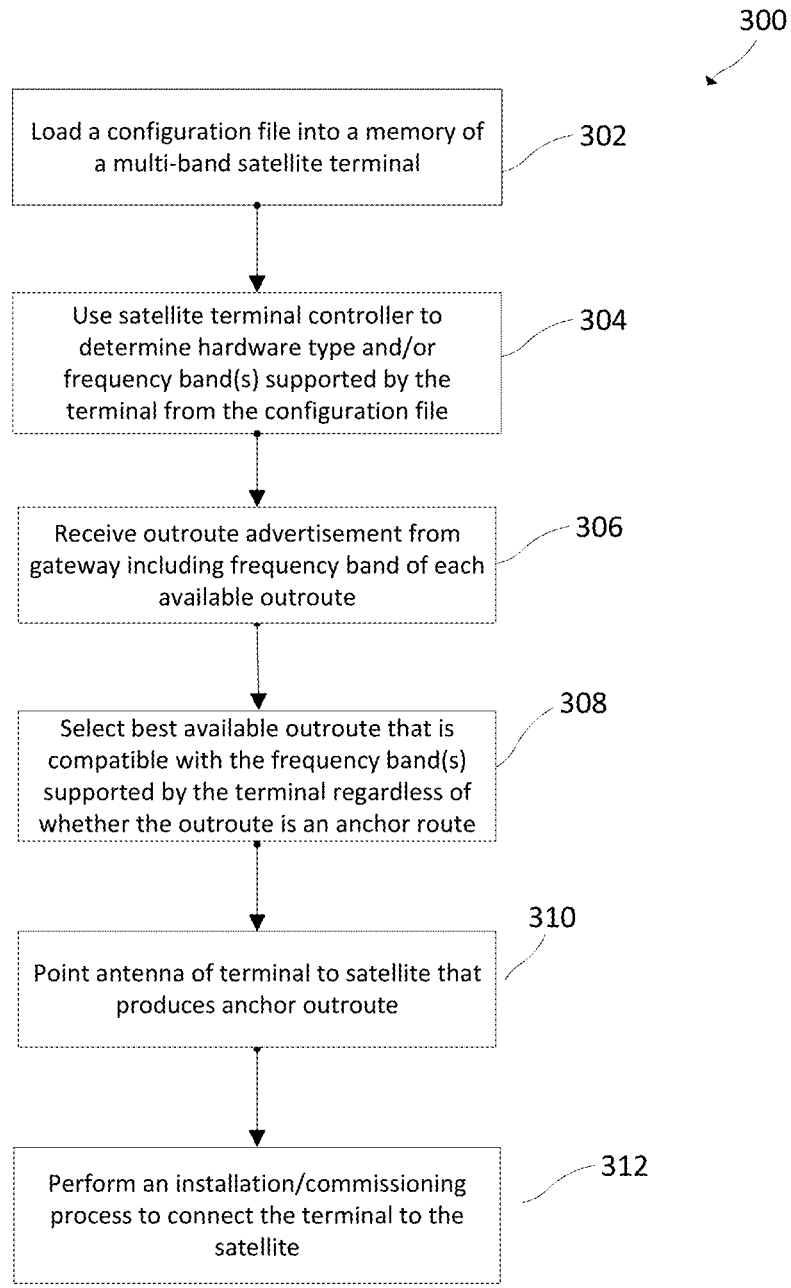
FIG. 3 is a flowchart of an example multi-band installation/commissioning process for commissioning a satellite terminal for a multi-band hybrid satellite communication system, such as the satellite communication system of FIG. 1.

A flowchart depicting an example multi-band installation/commissioning process 300 is shown in FIG. 3. The method 300 begins with loading a configuration file into a memory of a multi-band satellite terminal (block 302). The satellite terminal controller reads the configuration file to identify the hardware type in order to determine the frequency band(s) supported by terminal (block 304). An advertisement indicating available outroutes in a spot beam is received from a gateway (block 306). The best available outroute is then selected (which may or may not be the anchor route listed in the configuration file) that is compatible with the frequency band(s) supported by the terminal (block 308). For example, a Ka band outroute may be selected first if the terminal is even if it is not the first anchor outroute, because in rain the Ka band may be the most reliable and would presumably allow quicker pointing. The antenna of the terminal is then directed to the satellite that produces the beam for the selected outroute (block 310). Once an outroute has been selected, an installation/commissioning process is carried to connect the terminal to the satellite (block 312).

In a beam overlap area for which one beam is single-band and the other beam is multi-band, a multi-band terminal selects the multi-band beam based on some adaptive weighting. For example, systems typically have an overlap weighting factor that is used in selecting which satellite to switch to when a terminal is in an overlap area. In embodiments, the overlap weighting factor can be used as a basis for generating a multi-band weighting factor by adjusting the overlap weighting factor to apply some bias (e.g., <100%) toward the multi-band beam. It should be noted that this applies if the overlap is for beams of different bands from the same satellite as well as beam from different satellites.

In embodiments, satellite terminals report the operating bands that it supports to a network management system (NMS) for the satellite communication system during installation and commissioning. During installation, an installation quality verification process may be performed to verify the quality of the install, e.g., the quality of the signal between the terminal and the satellite. The installation quality verification process can differentiate targets for installation quality based on band, as well as whether dual-band (in case there is a performance difference in a dual-band installation vs single band for a given band) and checks each band for which quality metrics are produced.

It is to be noted that multiple bands can be from different satellites. For example, a terminal or VSAT can be installed in a region of overlapping beams from two satellites and each satellite supports a particular frequency band. The discussion so far done here related to the installation and commissioning process of a multi-band network applies to this multi-satellite scenario too. The only difference is that a multi-band VSAT with a steerable antenna would need to acquire signal from a different satellite in the event of a band switch is required for the satellite switch.

To facilitate outroute transmissions (i.e., transmission from the gateway to the satellite), gateway includes at least one Code Rate Organizer (CRO). A CRO is a module/component that organizes data transmissions over one or more outroute channels based on a modulation and coding (MODCOD) scheme such that utilization of the satellite frequency spectrum can be optimized. The CRO dynamically estimates the bandwidth capacity in terms of data rate and organizes the incoming data from IPGWs into a multiplexed data stream so as to fully utilize the spectrum bandwidth for transmission. Each CRO includes a multiplexing queue. IPGWs receive IP packets from network and queues and schedules the data packets for transmission to multiple remote terminals. The scheduled packets are then forwarded to multiplexing queues at the CROs.

Figure 4:
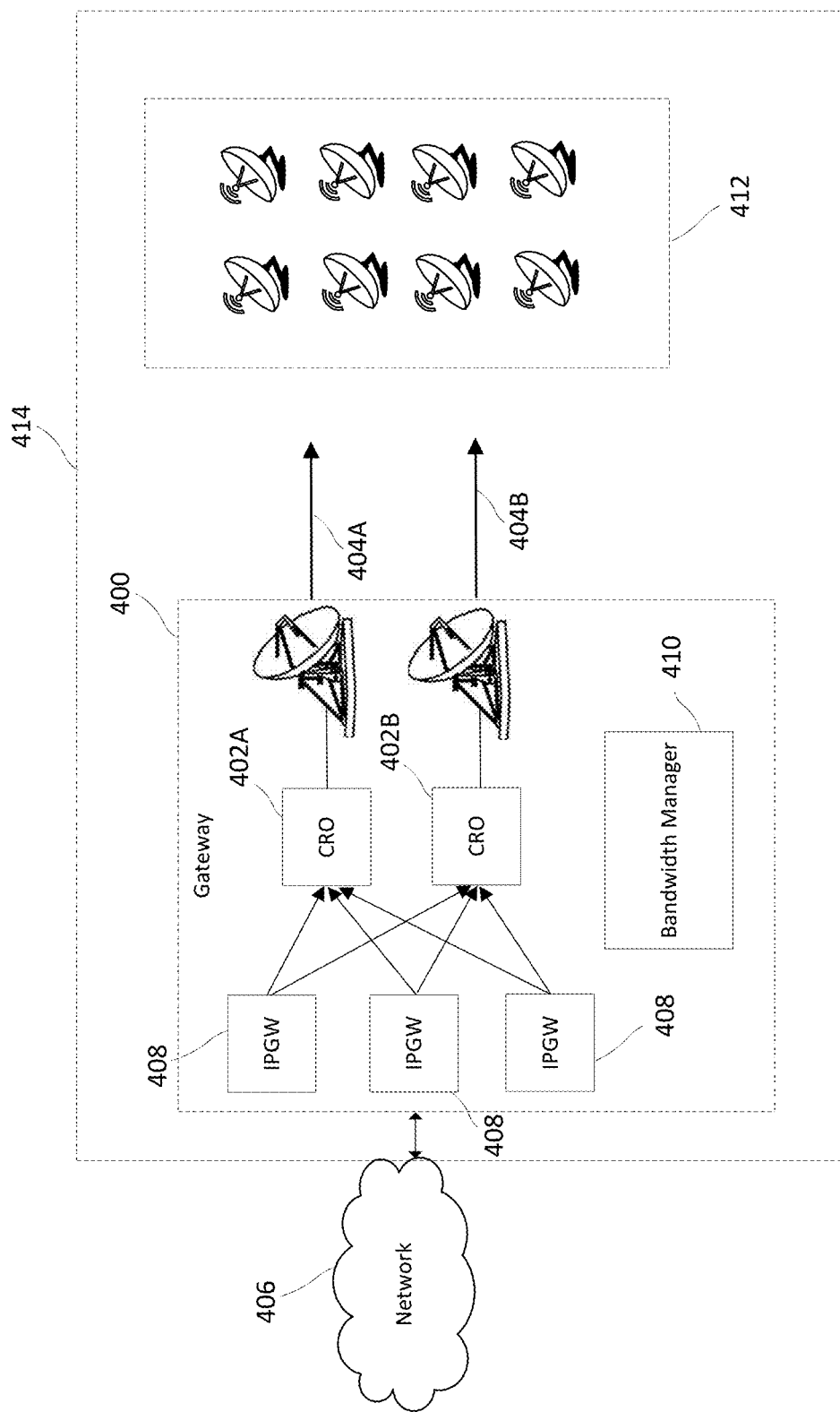
FIG. 4 shows an example implementation of a load balancing system for a multi-band hybrid satellite communication system, such as the satellite communication system of FIG. 1.

Referring to FIG. 4, a gateway load balancing system 400 typically includes a CRO 402A, 402B for each outroute channel 404A, 404B serviced by the gateway 400. In FIG. 4, the system 400 provides two outroute channels 404A, 404B and has two CROs 402A, 402B that respectively organize data transmissions over the outroutes 404A, 404B. The system 400 includes a plurality of IPGWs 408 that receive IP packets from a network 406. The IPGWs 408 queue and schedule the IP packets for transmission to multiple remote terminals. The scheduled packets are then forwarded to multiplexing queues at the CROs 402A, 404B.

In order to improve the distribution of loads between outroute channels 404A, 404B, terminals 412 may be switched between CROs 402A, 402B. Switching a terminal 412 from one CRO to another CRO can be understood to switch the terminal from a first outroute channel 404A associated with a first CRO 402A to a second outroute channel 404B associated with the second CRO 402B. One or more resource pools, also referred to as terminal groups, may be defined within the satellite communication system. A resource pool is a collection of outroutes and associated inroutes. Loads may be balanced across outroutes within a resource pool. A single resource pool 414 is shown in FIG. 4. Each resource pool 414 includes one or more IPGWs 408 and one or more CROs 402A, 402B.

The system includes a bandwidth manager 410 for adjusting loads within the resource pool 414 by assigning terminals 412 to IPGWs 408 and CROs 402A, 402B. The bandwidth manager 410 may manage multiple resource pools. However, the bandwidth manager 410 can only switch a terminal between IPGWs and CROs within the same resource pool. The bandwidth manager 410 is a software component which may be executed at the gateway 400 or in a server communicatively coupled to the gateway 400. The bandwidth manager 410 is programmed to adjust loads within a resource pool 414 such that the loading is more evenly distributed between the outroute channels 404A, 404B. The bandwidth manager 410 adjusts loads by selecting the IPGW 408 and CRO 402A, 402B to which a terminal 412 is assigned. A terminal 412 can only be assigned to one IPGW 408 and one CRO 402A, 402B at a given time. Further, a terminal can only be switched between IPGWs and CROs within a particular resource pool.

Outroute Load Balancing

In a multi-band system, there may be some beams that have only Ka-band resources and some beams that have both Ka and Q-band resources. Also, there can be hybrid terminals in the network with some terminals only Ka-band capable and other terminals that are multi-band capable. Therefore, it is important that the system load balancing algorithm takes these factors into consideration for outroute load balancing when that beam provides multi-band resources. The load balancing algorithm is designed in such a way that it works in conjunction with link adaptation techniques that may be implemented in the system. A link adaptation process may be implemented in the presence of multi-band availability that involves moving a VSAT or terminal to Ka-band resources when it observes fading at the higher frequency band (e.g., Q band). When fading goes away terminals are moved back to the higher band. The load balancing algorithm described herein can work in conjunction with such algorithms. The load balancing algorithm can also take service level agreements into consideration for load balancing (described in more detail below).

In a single band scenario, the outroute load balancing algorithm works without complexity as the target is to balance traffic load across outroutes within a beam which all are of the same frequency band for terminals operating in one band. Single band outroute load balancing schemes are known in the art. Such schemes must be enhanced to be applicable to multi-band scenarios.

There are two aspects of load balancing: a) initial outroute selection when a terminal becomes active, and b) subsequent load balancing of terminals and traffic across outroutes. It is assumed that a beam consists of both Ka and Q-band outroutes where Ka resources are smaller than the Q-band resources. Two types of terminals are present in this beam, terminals which are only Ka-band capable and terminals supporting both Ka and Q-bands.

One principle upon which a multi-band outroute load balancing algorithm should be based is that the outroute selection and load balancing should strive to save Ka-band resources for Ka-only terminals and limit moving Ka-only terminals to Q-band resources. Another principle is that load balancing and outroute selection algorithms must interact with the link adaptation algorithm. For example, Q-band outroutes fade away much faster than Ka-band outroutes. Multi-band terminals operating in Q-band outroutes therefore need to be moved to Ka-band outroutes to maintain service. The load balancing algorithm should take this into account. Also, the algorithm should take into consideration that multi-band terminals that have been moved to Ka-band outroutes because of Q-band fade should be moved back to the Q-band outroutes when the fade goes away. Outroute load balancing favors Q-band resources for multi-band terminals which are Q-band capable so that enough space can be left on Ka-band resources for other terminals that are Ka-band only capable, but not to the extent that a single Q-band carrier is congested while Ka-band carriers are uncongested. The algorithm also introduces randomization so that Q-band terminals do not move in blocks which can result in a see-saw effect.

If the Q-band outroute is loaded (i.e., not all terminals are faded), switching terminals to Ka-band resources is biased to be spectrally efficient by adjusting a weighting factor when, for example, derating the loading of a Ka-band outroute to compare to a Q-band outroute if the terminal is operating at a symbol rate of QPSK ½. QPSK ½ stands for quadrature phase shift keying ½ forward error correction (FEC) mode and refers to a modulation technique that uses two bits per symbol to cause a carrier to assume one of four possible states/values (e.g., 00, 01, 10, and 11) at a ½ FEC rate.

In outroute load balancing processes, terminals move between outroutes based at least in part on a congestion level of the CROs. Outroute switching can happen in both uncongested and congested scenarios. Three levels of congestion are considered: light congested, medium congested, and heavily congested. These terms are defined as follows:

When the average CRO or outroute utilization exceeds a configured threshold, the CRO is considered heavily congested. The averaging is taken over a set of load balancing outroutes within a beam.

When the average CRO or outroute utilization is less than the threshold (as above) but any of individual CRO's utilization is higher than a threshold (different than the previous threshold), the CRO is considered medium congested.

Otherwise, the system is considered as lightly congested.

Figure 5:
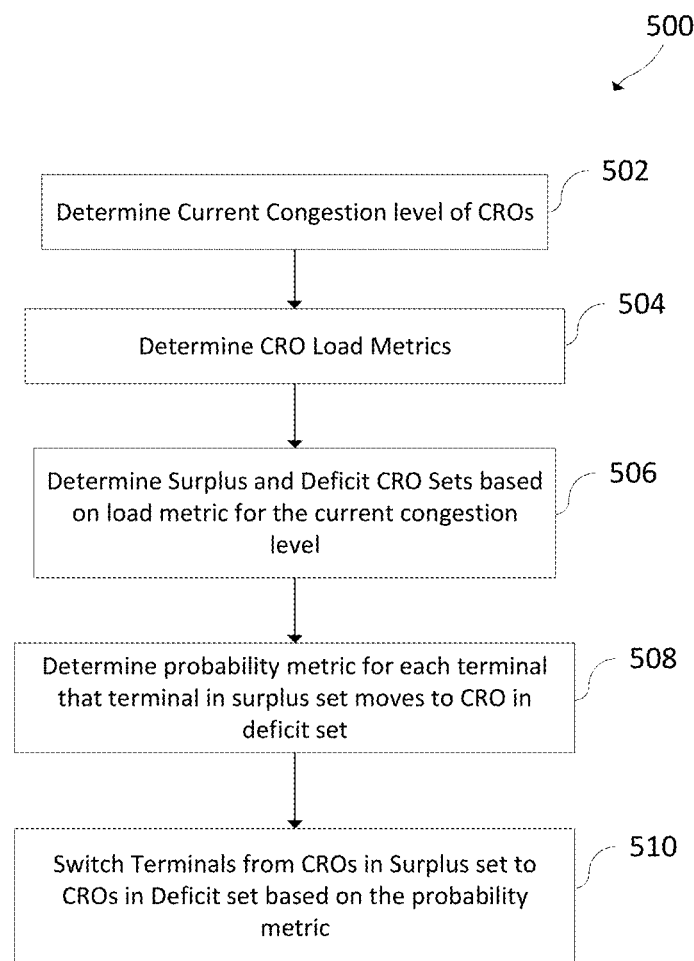
FIG. 5 is a flowchart of an example method for outroute load balancing in a multi-band hybrid satellite communication system, such as the satellite communication system of FIG. 1.

An example method for load balancing in multi-band hybrid satellite communication system is shown in FIG. 5. The method 500 begins with determining the current congestion level of the CROs (block 502). As noted above, congestion level of a CRO is based on CRO utilization and/or outroute utilization. Once the congestion level has been determined, a load metric of the CROs is determined (block 504). The load metric depends on the congestion level. For example, when CROs are heavily congested, load ratio of CROs is monitored, and when CROs are medium congested, active plan rate is monitored. The load metric is used as the basis for placing CROs in surplus and deficit sets (Block 506). Surplus sets refer to CROs that have terminals that are eligible to move out, and deficit sets refers to CROs that are eligible to move in to. A probability metric is then determined for each terminal of the CROs in the surplus set (block 508). The probability metric represents the probability that the terminal will move to a CRO in the deficit based on the current CRO load conditions. Terminals are then moved from CROs in the surplus set to CROs in the deficit set based on a probability metric (block 510).

Figure 6:
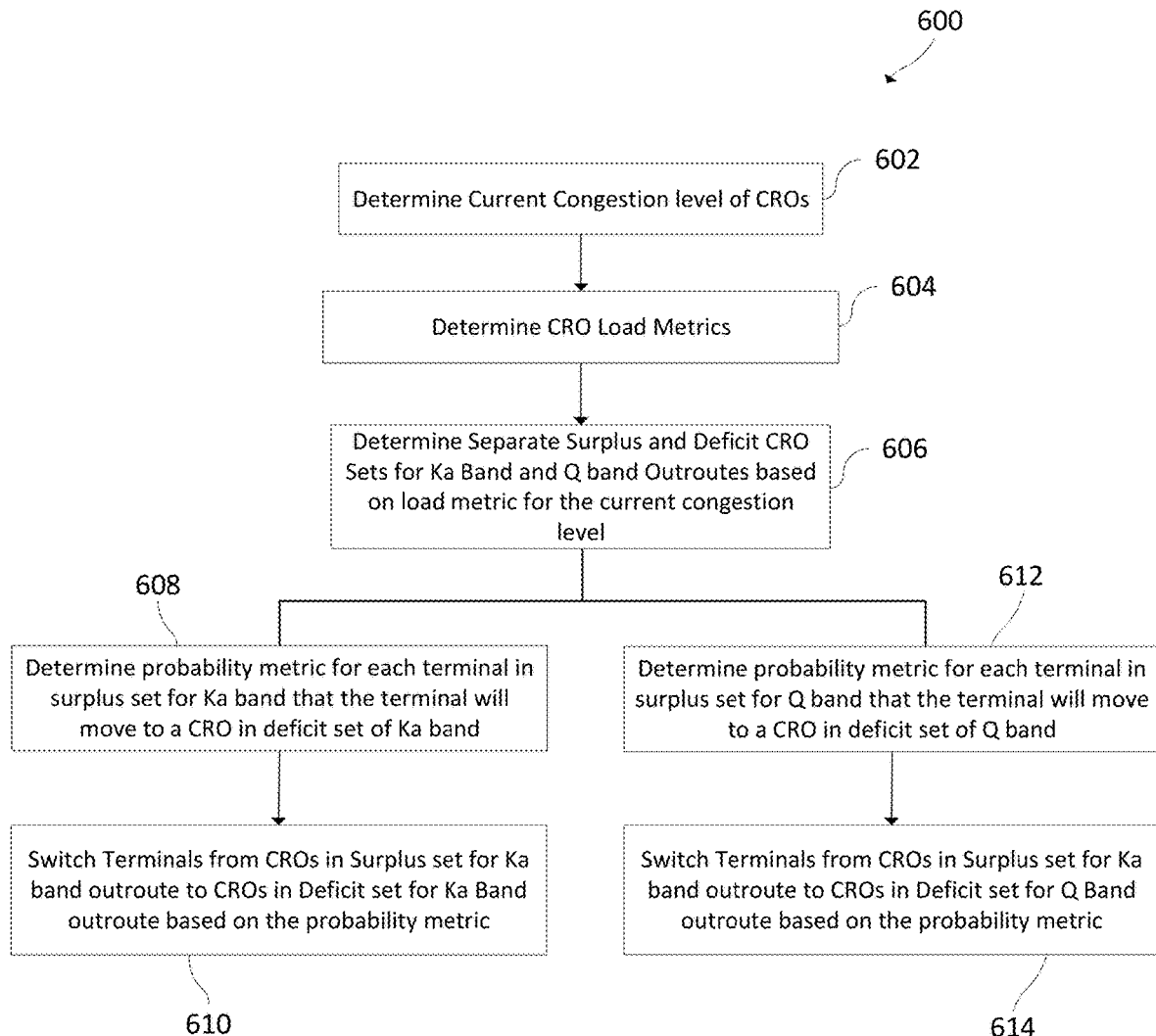
FIG. 6 is a flowchart of another example method for outroute load balancing in a multi-band hybrid satellite communication system, such as the satellite communication system of FIG. 1.

There are two options for outroute load balancing based on congestion level. In one option, the Ka-band and Q-band resources are treated as separate load balancing sets in the system. The other option treats resources from both bands as one load balancing set. FIG. 6 shows the method of FIG. 5 adapted to treat resources in Ka and Q bands separately for load balancing purposes. The method 600 begins with determining the current congestion level of the CROs (block 602). As noted above, congestion level of a CRO is based CRO and/or outroute utilization. Once the congestion level has been determined, a load metric of the CROs is determined (block 604). The load metric that is determined depends on the congestion level. For example, when CROs are heavily congested, load ratio of CROs is monitored, and when CROs are medium congested, active plan rate is monitored. The load metric is used as the basis for placing CROs in separate surplus and deficit sets for Ka band and Q band (Block 606). A probability metric is then determined for each terminal of the CROs in the surplus set for the Ka band (block 608), and a probability metric is then determined for each terminal of the CROs in the surplus set for the Q band (block 612). Terminals are then moved from CROs in the surplus set for the Ka band to CROs in the deficit set for the Ka band based on a probability metric (block 610), and terminals are moved from CROs in the surplus set for the Q band to CROs in the deficit set for the Q band based on a probability metric (block 614).

In a heavy congested case, the bandwidth manager 410 creates two sets, a surplus set and a deficit set, of CROs or outroutes. The surplus set is created or formed by including CROs having a load ratio that is greater than the average load ratio over CROs or over all outroutes in a load balancing set. Terminals associated with CROs in the surplus set are eligible to move out from these CROs or outroutes. The deficit set consists of CROs having a load ratio that is less than the average load ratio over all CROs or over all outroutes in a load balancing set. Terminals from CROs are eligible to move into CROs in the deficit set (or outroutes associated with these CROs). In summary, the surplus set is the set that is eligible for move-out based on load and the deficit set is the set that is eligible for move-in based on load. Movement between sets is based at least in part on a probability metric that is calculated for each terminal in a surplus set that corresponds to the probability that the terminal moves into a given deficit set.

Figure 7:
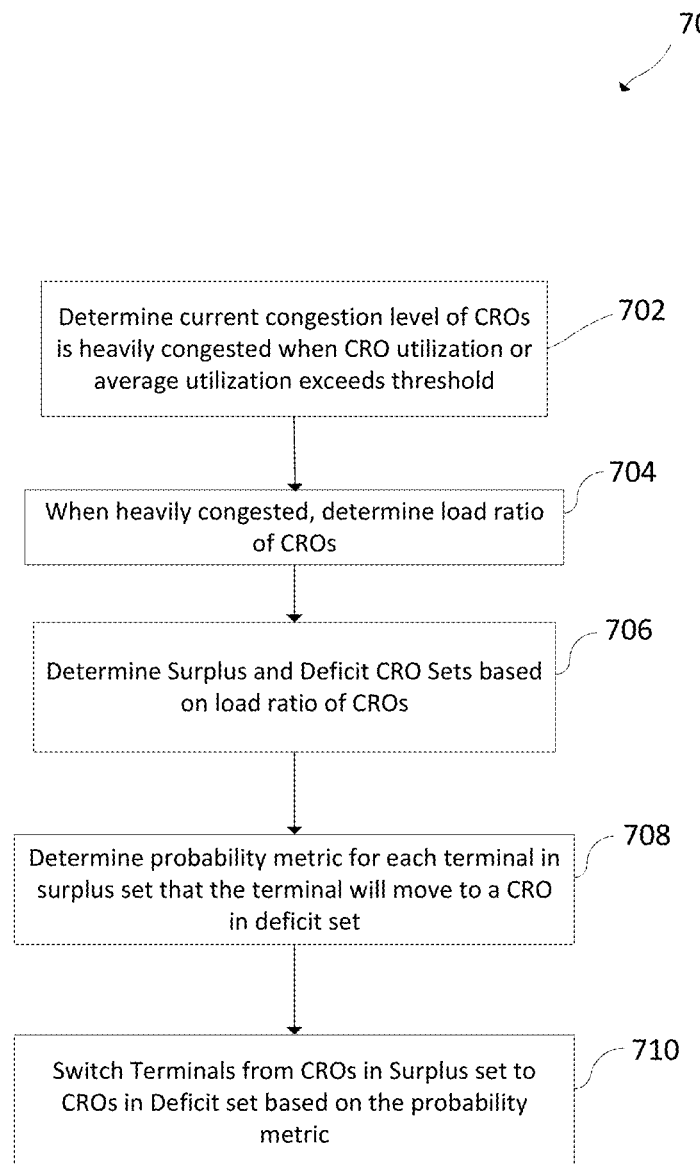
FIG. 7 is a flowchart of another example method for outroute load balancing in a multi-band hybrid satellite communication system, such as the satellite communication system of FIG. 1.

An example method for load balancing in multi-band hybrid satellite communication system in a heavily congested state is shown in FIG. 7. The method 700 begins with determining the current congestion level of the CROs is heavily congested when outroute utilization exceeds a threshold (block 702). Once the congestion level has been determined, the load ratio of CROs is determined (block 704). The load ratio is used as the basis for placing CROs in surplus and deficit sets (Block 706). A probability metric is then determined for each terminal of the CROs in the surplus set (block 708). The probability metric represents the probability that the terminal will move to a CRO in the deficit based on the current CRO load conditions. Terminals are then moved from CROs in the surplus set to CROs in the deficit set based on a probability metric (block 710).

When separate load balancing sets are defined for Ka and Q-band outroutes, surplus and deficit sets are created separately for Ka and Q-band resources. Ka-only terminals (and faded Q-band terminals) move between the surplus and deficit sets for the Ka-only outroute, and non-faded multi-band terminals move between the surplus and deficit set for the Q-band outroute. If both Ka-band and Q-band outroutes are considered in one load balancing set, the bandwidth manager takes into consideration the band capabilities of terminals and link conditions in addition to the load and utilization of the outroute/CRO to determine load metrices for outroute load balancing. When there are more Ka-only capable terminals and faded multi-band terminals, terminal movement is biased toward Q-band outroutes so that any terminal that is Q-band capable (and not in fade) can swiftly move out from a Ka-band outroute to a Q-band outroute. Bias may be implemented using a suitable biasing or weighting factor in probability metric calculation.

When the system is medium congested, similar to above, the bandwidth manager creates two CRO sets, a surplus set and a deficit set, but the metric used for the purpose of load balancing in this case is the active plan (i.e., subscription plan) rate of terminals in the CRO. The surplus set consists of CROs where the active plan rate of the CRO is greater than the average CRO active plan rate. The deficit set consists of CROs where the active plan rate of the CRO is less than the average CRO active plan rate. A probability is calculated—for a terminal in a plan rate surplus set, the probability that it moves into a certain plan rate deficit set.

Figure 8:
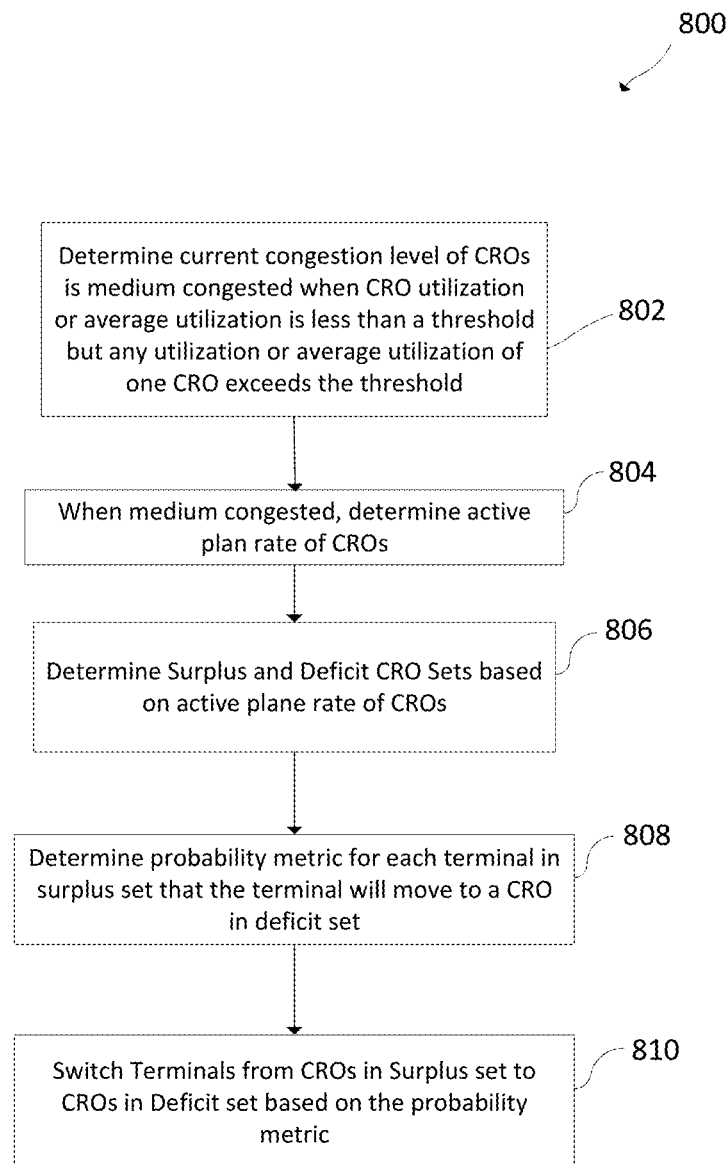
FIG. 8 is a flowchart of another example method for outroute load balancing in a multi-band hybrid satellite communication system, such as the satellite communication system of FIG. 1.

An example method for load balancing in multi-band hybrid satellite communication system in a medium congested state is shown in FIG. 8. The method 800 begins with determining the current congestion level of the CROs is medium congested when the CRO active plan rate of CROs exceeds a threshold (block 802). Once the congestion level has been determined, the active plan rate of CROs is determined (block 804). The active plan rate may be determined in any suitable manner, e.g., by normalizing the service plan rate of terminals on a CRO. The active plan rate is then used as the basis for placing CROs in surplus and deficit sets (block 806). A probability metric is then determined for each terminal of the CROs in the surplus set (block 808). The probability metric represents the probability that the terminal will move to a CRO in the deficit based on the current CRO load conditions. Terminals are then moved from CROs in the surplus set to CROs in the deficit set based on a probability metric (block 810).

When separate load balancing sets are defined for Ka and Q-band outroutes these surplus and deficit sets are created separately for Ka and Q-band resources. In this case, Ka-only terminals (and faded Q-band terminals) move between the surplus and deficit set of the Ka-only outroute, and non-faded multi-band terminals move between the surplus and deficit set of the Q-band outroute. If both Ka-band and Q-band outroutes are considered in one load balancing set, the bandwidth manager takes into consideration the band capabilities of terminals and link conditions in addition to the plan rate to determine load metrices for outroute load balancing. When there are more Ka-only capable terminals (and faded multi-band terminals), terminal movement is biased toward Q-band outroutes so that any terminal that is Q-band capable (and not in fade) can move out swiftly from a Ka-band outroute to a Q-band outroute. Bias may be implemented using a suitable biasing or weighting factor in probability metric calculation.

An upper limit threshold may be set that limits how many terminals can be moved to a CRO. The upper limit is based at least in part on the total number of terminals (active or not) in a resource group. In embodiments, the upper limit threshold is based on the total plan rate density of a CRO. The total plan rate density corresponds to a total weighted plan rate of terminals divided by the total estimated outroute capacity. When the total plan rate density of a CRO is greater than the average CRO total plan rate density by a predetermined margin, the CRO is designated a non-move-in CRO. In other words, terminals are not allowed to move into the outroute associated with that CRO.

In the lightly congested case, a terminal is kept with its current CRO/outroute when three conditions are met: (1) the utilization of the CRO is lower than the overall average CRO utilization, (2) the total plan rate density of the CRO is <=to the average CRO total plan density plus, and (3) one of the following is true:

The utilization of the IPGW associated with CRO is <=a threshold value A;

the average utilization of IPGWs connected with the CRO is <=the threshold value A;

the average utilization of IPGWs connected with the CRO is not more than the overall average IPGW utilization plus a predetermined margin; and the utilization of all IPGWs connected to the CRO is >a threshold B where B>A.

Figure 9:
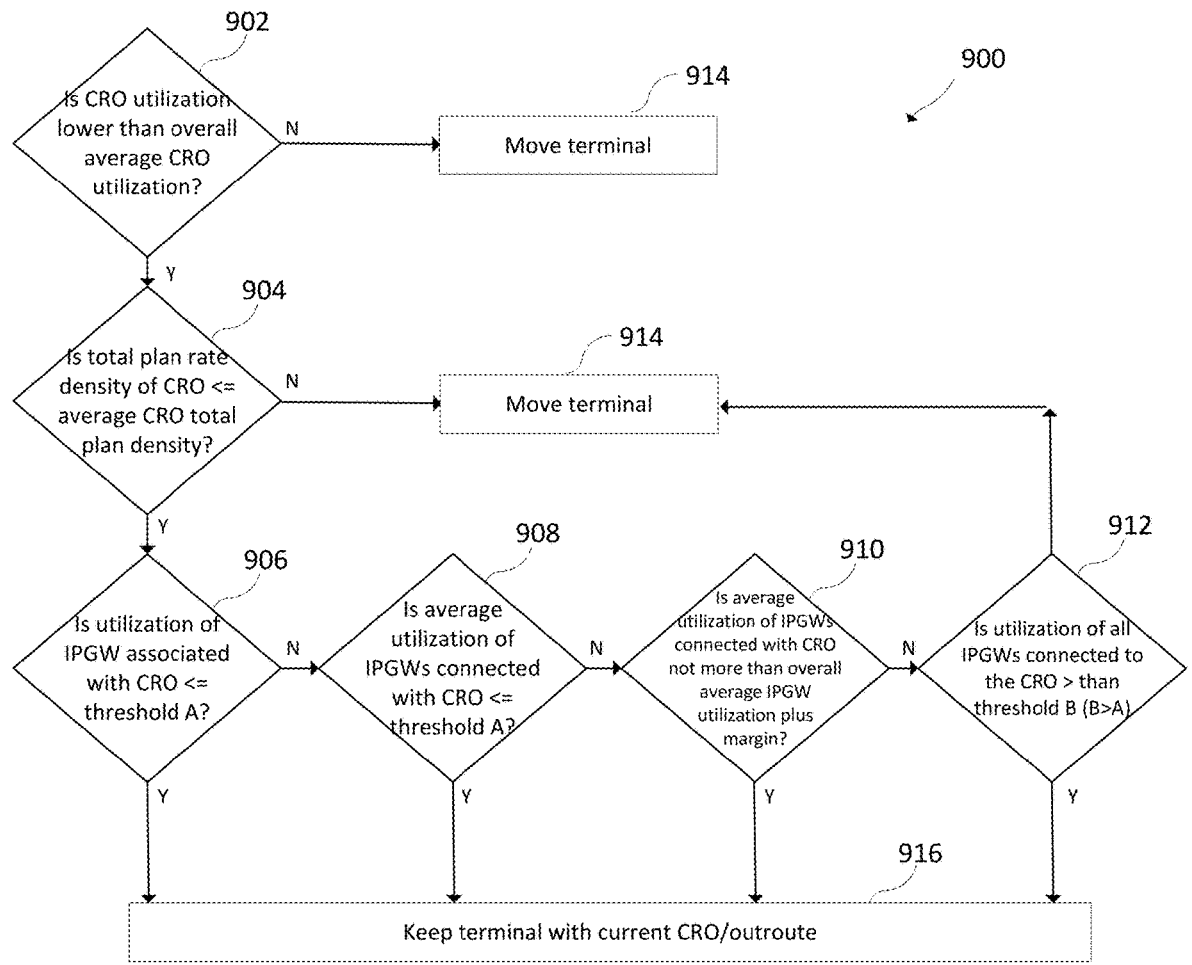
FIG. 9 is a flowchart of another example method for outroute load balancing in a multi-band hybrid satellite communication system, such as the satellite communication system of FIG. 1.

A flowchart of a method of determining when to keep a terminal with its current CRO/outroute under lightly congested conditions is shown in FIG. 9. The method 900 begins with determining whether the CRO utilization is lower than the overall average CRO utilization (block 902). If not, the terminal may be moved (block 914). If the CRO utilization is lower than the overall average CRO utilization, a determination is made as to whether the total plan rate density of the CRO is <=to the average CRO total plan density (block 904). If not, the terminal may be moved (block 914). If the total plan rate density is less than or equal to the average CRO total plan density, a determination is made as to whether the utilization of the IPGW associated with CRO is less than a threshold A (block 906). If it is, then the terminal may be kept with its current CRO/outroute (block 916). If it is not, a determination is made as to whether the average utilization of IPGWs connected to the CRO <=threshold A (block 908). If it is, then the terminal may be kept with its current CRO/outroute (block 916). If it is not, a determination is made as to whether the average utilization of IPGWs connected with the CRO is not more than the overall average IPGW utilization plus a predetermined margin (block 910). If it is, then the terminal may be kept with its current CRO/outroute (block 916). If it is not, a determination is made whether the utilization of all IPGWs connected to the CRO is greater than a threshold B where B>A (block 912). If it is, then the terminal may be kept with its current CRO/outroute (block 916). If it is not, the terminal may be moved (block 914).

Thus, outroute movement is driven by IPGW load balancing in the lightly congested cases. If moving to a different IPGW needs an outroute move, then only a movement happens. IPGW load balancing takes either the band-capability of terminals or band-capability of outroutes into account. The other option is balancing terminals across outroutes in their current bands, and have terminals make all band switch decisions.

In the context of network-initiated load balancing, the bandwidth manager strives to balance Highly Active User Terminals (HUTs) across outroutes within a beam. HUTs are those terminals that are frequently active in transmission with large backlogs such as video stream users. When there is an uneven distribution of this type of terminal, degraded quality of service (QOS) could result for users on an outroute where the HUTs are heavily located.

In the presence of only a single band outroute, each IPGW identifies the number of HUTs for each associated outroute and reports the number of HUTs of the respective outroute to the Bandwidth Manager. The Bandwidth Manager determines the number of targeted HUTs for each outroute by balancing the number of HUTs across outroutes and determines those outroutes for switching in or out HUTs. The Bandwidth Manger application sends requests to IPGWs to move HUTs between outroutes, and the IPGW initiates the move based on bandwidth manager's request. This is a form of network-initiated load balancing.

When the system has multi-band beams and hybrid single-band and multi-band capable terminals, the network-initiated load balancing process is enhanced by configuring the bandwidth manager to take into consideration the link margin of HUT terminals and the bands support capability in deciding to switch terminals between outroutes in order to balance single-band and multi-band capable HUT terminals across outroutes of different bands.

The simplest principle is to balance the Ka-only capable HUT terminals across Ka-band resources and dual Ka and Q band HUT terminals across Q-band outroutes. The issue with this simplistic approach is that the multi-band capable terminals could be in a fade so that the terminals would need to be moved to Ka-band resources for availability. In addition, it is possible that the number of Ka and Q-band resources available within a beam are not proportional to the number of Ka-only capable HUT terminals and dual band capable HUT terminals, respectively. When resources are proportional, the simplistic approach works well.

Figure 10:
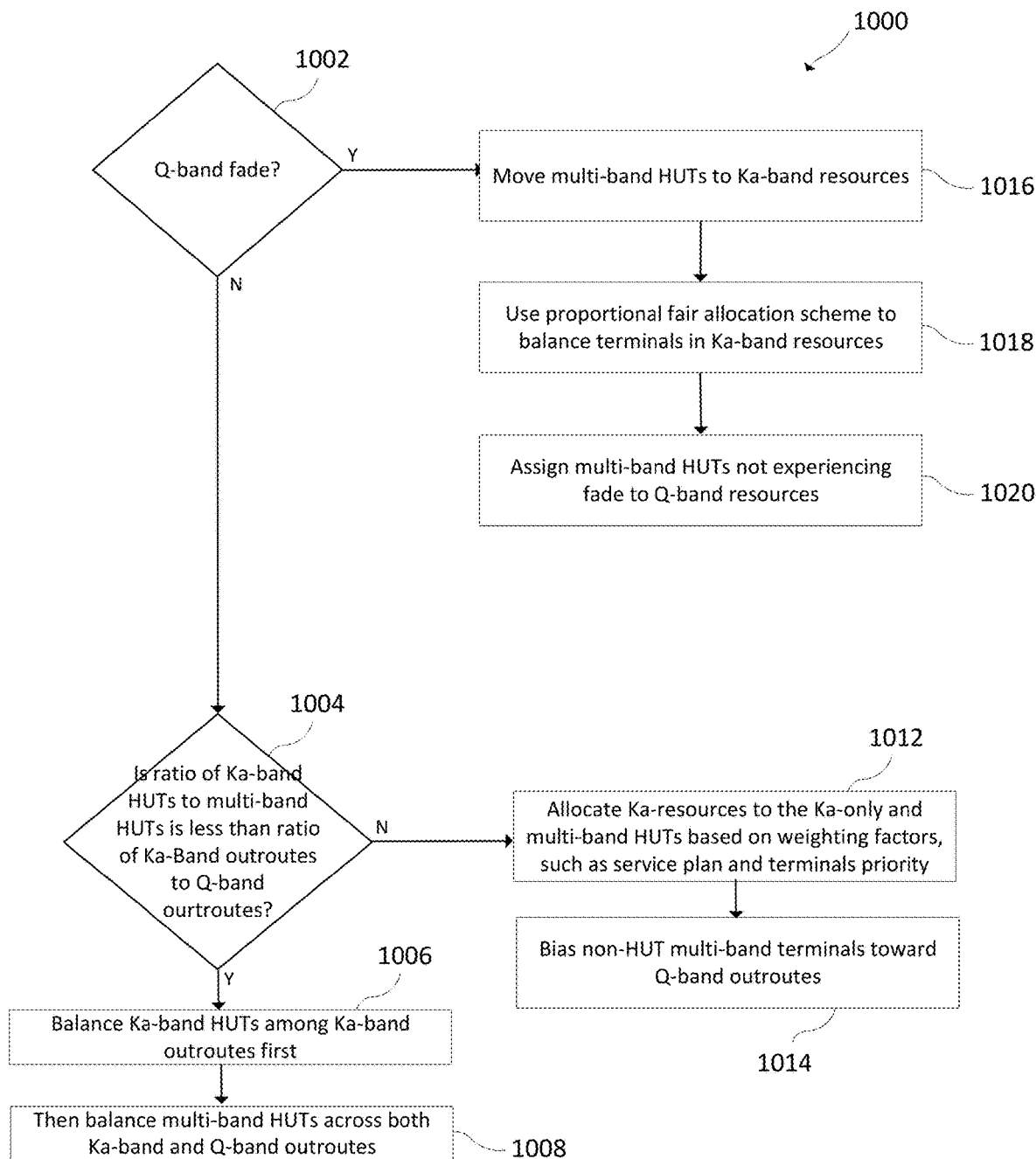
FIG. 10 is a flowchart of an example method for load balancing highly active terminals in a multi-band hybrid satellite communication system, such as the satellite communication system of FIG. 1.

For the non-simplistic case (i.e., numbers of resources not proportional), there are two cases considered: no fade and Q-band fade cases. In the no fade case, both Ka-band and Q-band outroute resources are treated as one pool of resource for the multi-band capable terminals. However, there are also Ka-band terminals which can work only on Ka-band outroutes in the network. An example method 1000 of balancing HUTs across outroutes in a beam is shown in FIG. 10. If there is no Q-band fade (block 1002), a determination is made as to whether the proportion of Ka-band HUTs to multi-band HUTs is less than the proportion of Ka-band outroutes to Q-band outroutes (block 1004). If it is, the bandwidth manager first balances the Ka-band HUTs among Ka-band outroutes (block 1006) and then balances the multi-band HUTs across both Ka-band and Q-band outroutes (block 1008). If the proportion of Ka-band HUTs to multi-band HUTs is more than the proportion of Ka-band outroutes to Q-band outroutes, the bandwidth manager will not get enough Ka-band capacity to accommodate Ka-only HUTs. There is nothing that can be done in this case. If there are not enough Q-band resources for multi-band HUTs, the multi-band HUTs must share Ka-resources with Ka-only HUTs. In this case, Ka-resources would be allocated to the Ka-only and multi-band HUTs based on weighting factors, such as service plan and terminals priority (block 1012). In this case, non-HUT multi-band terminals are biased toward Q-band outroutes (block 1014).

Q-band outroutes may fade faster than Ka-band outroutes. In this case, if there is Q-band fade (block 1002), multi-band HUTs would need to move to Ka-band resources (block 1016), and therefore Ka-band outroutes will be congested. Then a proportional fair allocation scheme is used between various types of terminals in Ka-band resources (block 1018). The multi-band HUTs not experiencing fading will be assigned to Q-band resources (block 1020).

Differentiated Service

In embodiments, a system could allow differentiated service plans based on different service availability criteria. As an example, a system may allow customers to purchase a higher availability service plan that requires a higher level of availability of resources and a lower availability service plan that requires a lower level of availability of resources. To enable a higher level of availability for a multi-band terminal having a higher availability service plan, the multi-band terminal is permitted to load balance between Ka-band and Q-band outroutes and inroutes based on the load balancing criteria discussed. Because there are typically a lower number of resources available on the Ka-band, multi-band terminals with the lower availability service plan would be limited to using only Q-band. This ensures that the Ka-band resources are available for multi-band terminals of the higher availability type when needed. The outroute load balancing algorithm can be biased toward the selection of Ka-band outroutes for the multi-band terminals having the high availability service plan while the opposite is true for terminals having the lower availability service plan.

It is possible that terminals having the lower availability service plan may use Ka-band during the commissioning and installation procedure and for carrier grade VOIP services including 911 call support. It is to be noted that when Ka-band resources are not used by multi-band terminals with the higher availability service plan, these resources can be used by the terminals with the lower availability service plan if Q band resources are congested or there is fading issue. However, these lower availability terminals would get preempted from Ka-band resources when enough high availability multi-band terminals show up in the network that cannot use Q band resources due to link condition issues.

To enable differentiated service plans that allow any multi-band terminal, regardless of whether it has a higher or lower-level availability plan, to be able to use both frequency band resources (Ka or Q band), rules, such as a volume cap (e.g., hours per month or hours per day) and/or a rate cap (e.g., 200 kbps), may be defined for lower priority terminals that limit usage of high priority resources. Use of high priority resources could also be based at least in part on conditions on the Q band. This would enable low priority terminals to use Ka band to maintain service when weather conditions, such as rain, impact the service on the Q band. Low priority terminals would be weighted heavily for load balancing purposes so that they would be the first terminals moved to Q-band when Q-band conditions improve, e.g., when the rain stops. While using Ka band, low priority terminals may also be subject to any volume cap and/or rate cap limits set for their plan. As a result, the impact on available of resources for high priority terminals is limited.

Mobility

Frequency bands higher than Ka-band are more susceptible to weather and rain. Therefore, in mobility applications (specifically in aero applications), the usage of Q/V band by a Q/V band capable VSAT is recommended when the plane is flying over clouds in a clear sky. Preventing violations of PSD (Power Spectral Density) regulatory limits is an important item in aero applications where smaller antennas are typically utilized. When a VSAT is operating in the Q/V frequency band, the system ensures that the PSD regulatory limits are not violated.

Figure 11:
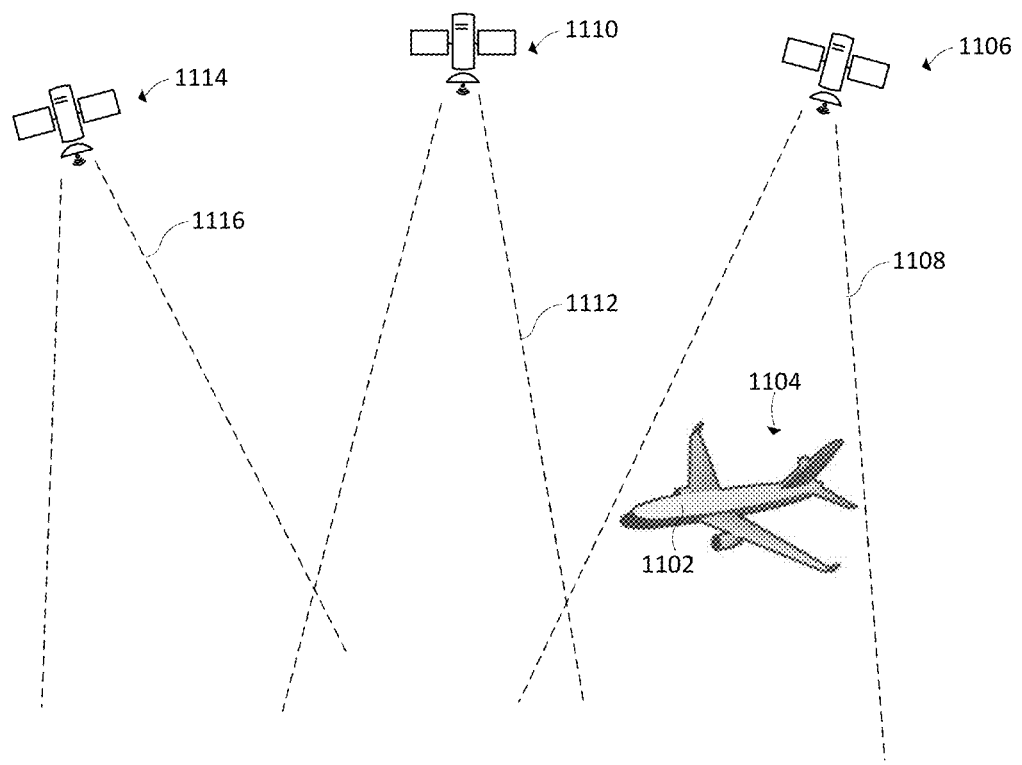
FIG. 11 is an illustration of a beam switching scenario for a mobile satellite terminal in a multi-band hybrid satellite communication system, such as the satellite communication system of FIG. 1.

FIG. 11 shows a mobile aero terminal 1102 on airplane 1104. A first satellite 1106 is producing a first spot beam 1108, a second satellite 1110 is producing a second spot beam 1112, and a third satellite 1114 is producing a third spot beam 1116. Each time the mobile aero terminal 1102 passes from one spot beam to another, beam switching occurs. With the advent of higher frequency (lower wavelength) carriers, the size of spot beams is getting reduced which results in very frequent beam switching by a mobile terminal. Therefore, selecting the right frequency band by the terminal for transmission is important for providing a high-quality service to in-flight users. In the example of FIG. 11, the three spot beams are shown as being produced by three separate satellites. However, in implementations, a single satellite, or any number of satellites, could produce the spot beams in different beam switching scenarios.

If a mobile terminal is only single band capable (e.g., Ka band), the terminal will select an outroute of the appropriate frequency band and learn the corresponding inroutes when a beam switch occurs. However, it is possible that a spot beam may not have the appropriate frequency band for the terminal. For example, if the mobile aero terminal was Ka-band only and the spot beam 1112 only supports Q-band, the terminal would have to wait until the terminal reaches a beam having the appropriate frequency band. In this case, the mobile terminal's beam switch would not be seamless and the terminal would likely operate with a degraded link condition until the appropriate frequency band is found.

The single band mobile terminal operation with respect to beam switch is a simple scenario. However, beam switching for mobile terminals having multi-band capability is more complex. In this case, the mobile terminal should be configured to take beam bands and antenna capability into account for beam selection in beam overlap areas in a multi-band system. The system is typically designed such that it ensures that a mobile terminal with multi-band capability switches to the next beam as soon as it is required without waiting for the most favorable beam with respect to the frequency band.

As an example, referring to FIG. 11, a mobile multi-band aero terminal 1102 is approaching the second spot beam 1112 emitted by satellite 1110 and will enter into the third spot beam 1116 emitted by satellite 1114 a short time later. The spot beam 1112 has only Ka band resources while the spot beam 1116 has both Ka and Q band resources. The mobile terminal 1102 has the option of beam switching immediately to spot beam 1112 and utilize the Ka band only resources or can wait until the terminal can beam switch to spot beam 1116 to have access to multi-band resources. In this case, the mobile terminal 1102 would select the Ka-only resource since it is available now even though the terminal may get more throughput from the multi-band beam by using the Q-band resource had the terminal delayed the beam switch.

In embodiments, a policy may be defined to control the operation of a terminal in this scenario. In particular, a policy may be defined that enables the mobile terminal 1102 to have a look ahead capability to see if there is a beam with Q-band resources that will be reached within a predetermined waiting time based, for example, on the flight speed and direction vectors. In embodiments, the waiting time is configurable. If the terminal determines that the terminal will have access to a multi-band beam within the predetermined waiting time period, the terminal can avoid selecting the single band beam and wait until it reaches the multi-band beam to switch beams. In embodiments, multiple policies may be defined that control beam switching behavior in different scenarios. For example, a third policy may be defined that requires a multi-band mobile terminal to switch immediately to Ka band only beams to minimize service outage and then switch to a multi-band beam as soon as one is found even though the signal quality is still perfect on the Ka-band beam.

Figure 12:
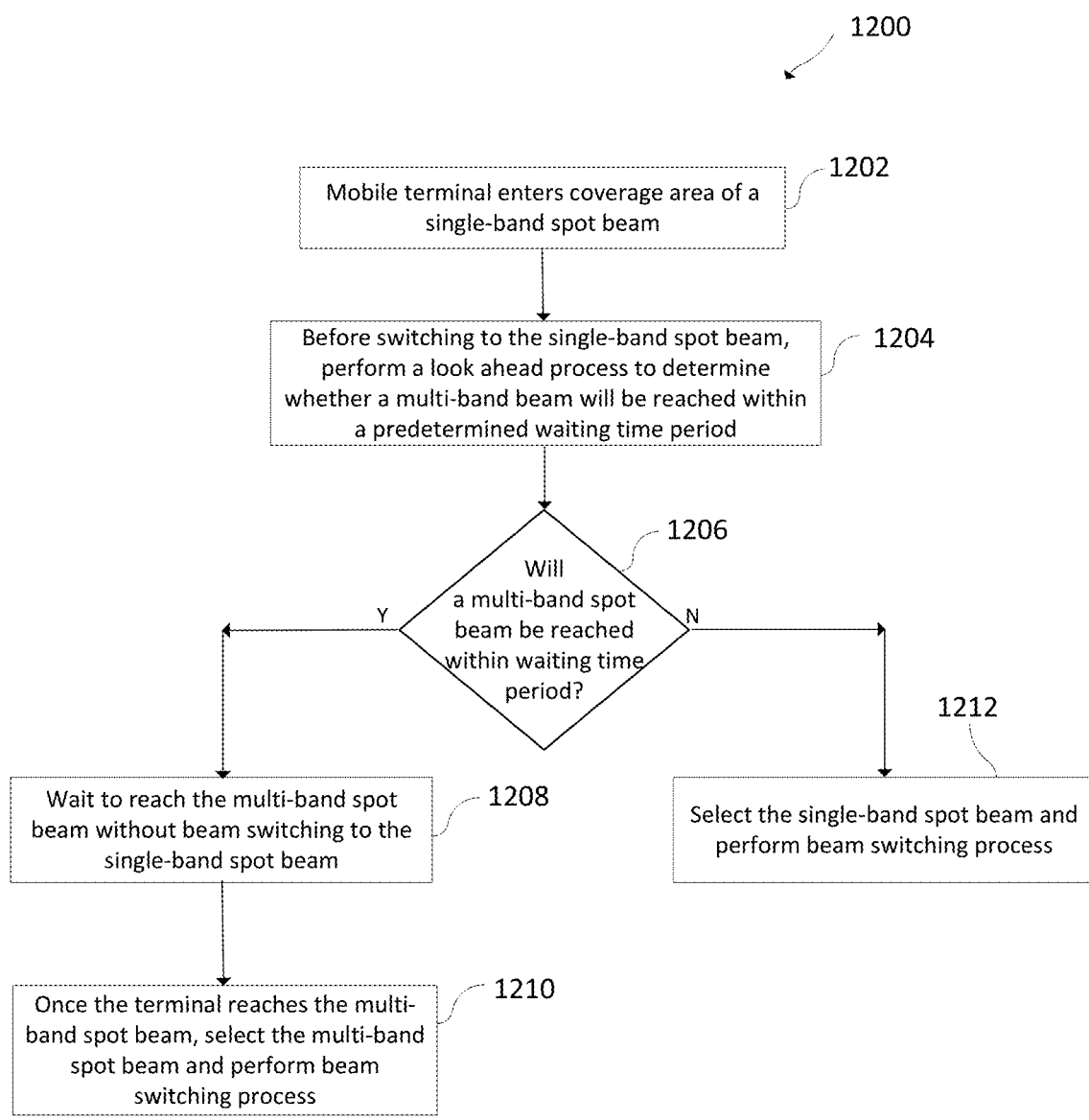
FIG. 12 is a flowchart of an example method of beam switching for a mobile satellite terminal in a multi-band hybrid satellite communication system, such as the satellite communication system of FIG. 1.

An example method 1200 of controlling beam switching behavior for a mobile aero terminal is shown in FIG. 12. The mobile aero terminal in this case is a double-band terminal meaning that is capable of both receiving both Ka and Q band data transmissions.

The method begins with the terminal entering the coverage area of a single-band spot beam, e.g., a Ka-only spot beam (block 1202). Because the terminal is in a single-band spot beam, the terminal performs a look ahead process before switching to the single-band spot beam to determine if there is a multi-band spot beam that the terminal will reach within a predetermined waiting time period (block 1204). Waiting time periods may be configurable depending on overlapping areas. In embodiments, any suitable wait time period may be used. To accomplish this, the terminal is configured to receive speed and direction vector information pertaining to the plane in which it is incorporated. The terminal knows, or can learn, the positions of nearby spot beams. For example, the terminal can receive communications from system controller identifying spot beams that are in the flight path of the plane, indicates the band(s) supported by the spot beams, and provides the positions of the spot beam. The terminal is configured to check to see if a multi-band spot beam is in the flight path and to determine when the multi-band spot beam will be reached based on the current speed of the plane. If the terminal determines that a multi-band spot will be reached within the predetermined waiting time period (block 1206), the terminal does not switch beams to the current single-band spot beam and waits until the plane reaches the multi-band spot (block 1208). Once the terminal reaches the multi-band spot beam, the terminal selects the multi-band spot beam and performs a beam switching process to establish communication with the satellite producing the multi-band spot beam (block 1210). If there is no multi-band beam in the flight path that can be reached within the predetermined waiting time period, the terminal selects the current single-band spot beam and performs the beam switching process to connect to the satellite producing the current single-band spot beam (block 1212).

It is to be noted that typically in aero application the antenna with lower gain is used to meet the regulatory PSD limit. Hence, the operation of a mobile terminal is mostly biased towards the lower frequency Ka-band based on the altitude and antenna orientation or signal quality. When a multi-band capable mobile terminal switches to a beam which also has multi-band resources, the rules to follow in selecting outroute and inroute resource bands are the same as described for fixed terminals. For example, the algorithm shall make sure that space is left in Ka-band outroutes within a beam so that Ka-only mobile terminals can receive service.

Dynamic Outroutes and Inroutes Creation/Flexible Payload Satellite

Satellite communication systems are generally capable of performing dynamic inroute reconfiguration (DIR) processes and dynamic outroute reconfiguration (DOR) processes. DIR processes utilize a channel quality indicator (CQI) margin of terminals as well as the traffic demand of terminals as the basis for creating inroutes with appropriate symbol rates and an appropriate number of symbols for the terminals. For DIR and DOR processes, modern satellites are being launched which are built with channelizers that make them flexible and reconfigurable in that any feeder link spectrum can be switched to any amount of spectrum in any user beam. The ground system of a satellite communication system can be designed to support flexible reconfigurable satellite capabilities. When satellite spectrum or resources are reconfigured, the DOR process dynamically creates outroutes from the modified spectrum in accordance with terminals capability with a preference towards largest possible symbol rates for outroute carriers.

Previously known DIR and DOR processes, however, must be modified to work with terminals that are multi-band capable and, in particular, to work with a mix of terminals with some terminals being single band (e.g., only Ka-band capable) and some terminals being multi-band capable (e.g., both Ka and Q/V-band capable). To accomplish this, the DIR process is enhanced to determine the appropriate number of different bands of inroutes in addition to determining various symbol rates. This requires that the number of active terminals be known and the band transmission capabilities of the active terminals. An active terminal is a terminal that has transmitted and/or received traffic within a predetermined time period. The CQI margin of the active terminals is used to determine how many terminals are able to operate on Q-band inroutes.

Similarly, the DOR algorithm is enhanced to determine the number of different outroutes for the different frequency bands that need to be created in a flexible payload operation when frequency planning is reconfigured. Similar to DIR, the algorithm considers terminals band reception capabilities and proportion of Ka-only to multi-band capable terminals. Also, the average link margin of terminals is considered.

Figure 13:
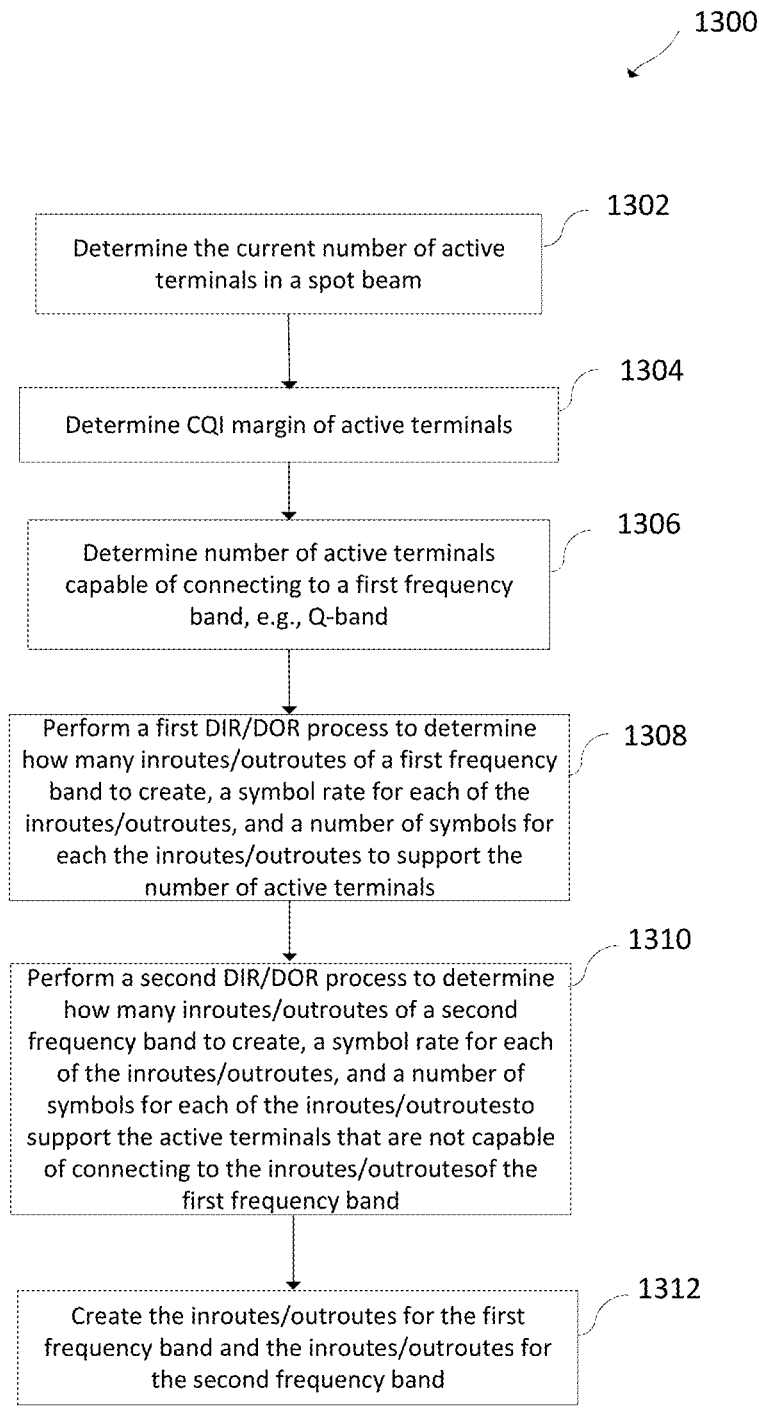
FIG. 13 is a flowchart of an example method of performing dynamic inroute/outroute reconfiguration for a multi-band hybrid satellite communication system, such as the satellite communication system of FIG. 1.

An example method of performing dynamic inroute reconfiguration (DIR) and dynamic outroute configuration (DOR) for a group of terminals having both single-band and multi-band capable terminals is shown in FIG. 13. The method begins by determining the current number of active terminals in a spot beam (block 1302). The CQI margin of the active terminals is then determined (block 1304). CQI may be determined in any suitable manner known in the art. The CQI margin is then used to determine the number of active terminals that are capable of connecting to inroute/outroutes of a first frequency band, e.g., Q-band (block 1306). A first DIR process is then carried out to determine how many inroutes/outroutes of a first frequency band (e.g., Q-band) to create, a symbol rate for each of the inroutes/outroutes of the first frequency band, and a number of symbols for each of the inroutes/outroutes to support the number of active terminals capable of operating in the first frequency band (1308). A second DIR process may also be performed to determine the number of inroutes/outroutes of a second frequency band (e.g., Ka-band) to create, a symbol rate for each of the inroutes of the second frequency band, and a number of symbols for each inroutes/outroutes to support all of the active terminals that are not capable of handling traffic in the first frequency band (block 1310). Any suitable DIR process may be used to determine the number of inroutes/outroutes and the symbol rates and number of symbols for the inroutes/outroutes. Once the specification for the inroutes/outroutes of the first frequency band and the second frequency band have been determined, the inroutes/outroutes for the first frequency band and the inroutes/outroutes for the second frequency band are created (block 1312).

Hybrid Receive and Transmit

In embodiments, a multi-band capable terminal may be capable of hybrid operation by using inroutes of a first frequency band and outroutes of a second frequency band, e.g., a Q-band inroute and a Ka-band outroute. The inroute and outroute for a terminal comes from the same satellite so the timing is the same. Inroute power calculations must still be performed. Inroute power calculations are known and based at least in part on inroute fade. For standard operation where the inroute and outroute for a terminal are in the same frequency band, the magnitude of the inroute fade corresponds substantially to the magnitude of the outroute fade. However, when the inroute and outroute for a terminal are in different frequency bands, the magnitude of the inroute fade does not correspond to the magnitude of the outroute fade. Therefore, outroute fade cannot be used directly for inroute power calculations for hybrid operation as it is for standard operation.

To enable inroute power calculations for hybrid operations, the system determines a factor which is used to derive the inroute fade to use for inroute power calculations from the outroute fade. In embodiments, the factor corresponds to a ratio of the inroute fade for inroutes of a first frequency band, e.g., Ka-band, to the outroute fade for outroutes of a second frequency band, e.g., Q-band. In embodiments, this factor is determined in two steps. In the first step, the system determines a factor that defines the relationship between Ka-band outroute fade and Q-band outroute fade for a spot beam. The factor can be determined by identifying the Ka-band outroute fade for standard operation and Q-band outroute fade for standard operation in the spot beam. The factor is then determined as a ratio of Ka-band outroute fade to Q-band outroute fade. This factor will be <1 because Ka-band outroute fade is generally not as severe as Q-band outroute fade under the same conditions. The factor is saved in a memory of the system and used to derive the inroute fade to use in inroute power calculations for hybrid operations.

Figure 14:
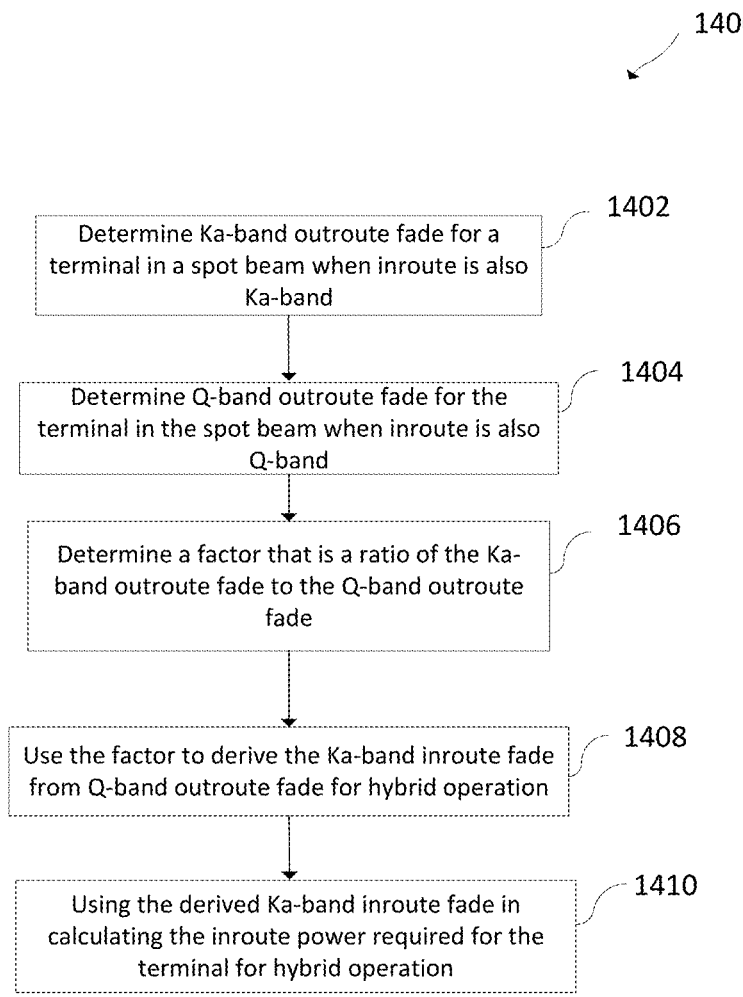
FIG. 14 is a flowchart of an example method for calculating inroute power for a hybrid operation of a multi-band terminal of a multi-band hybrid satellite communication system, such as the satellite communication system of FIG. 1.

An example method of calculating inroute power for hybrid operation of a multi-band terminal is shown in FIG. 14. The method begins by determining the Ka-band outroute fade for the terminal for standard operations when Ka-band is used for the inroute (block 1402). The Q-band outroute fade is also determined for standard operation when Q-band is used for the inroute (block 1404). A factor that corresponds to the ratio of the Ka-band outroute fade to the Q-band outroute fade is then determined (block 1406). During hybrid operation when the inroute for the terminal is in the Ka-band and the outroute is in the Q-band, the factor is used to derive the Ka-band inroute fade from the Q-band outroute fade, e.g., by multiplying the Q-band outroute fade for hybrid operations by the factor (block 1408). The inroute power for the terminal is then calculated using the derived Ka-band inroute fade (block 1410).

Multi-Satellite Operation

Figure 15:
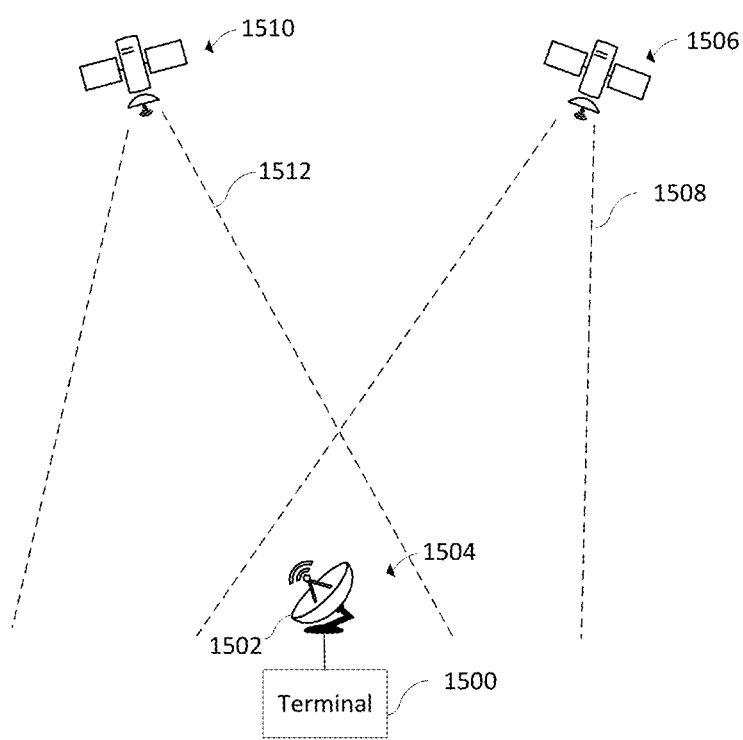
FIG. 15 shows a multi-band satellite terminal in an overlapping beam region produced by two satellites of a multi-band hybrid satellite communication system, such as the satellite communication system of FIG. 1.

Another issue that multi-band capable terminals bring to satellite communication system has to do with multi-satellite operations. For example, referring to FIG. 15, a multi-band terminal 1500 having a steerable antenna 1502 may be positioned in an overlap region 1504 formed by the spot beam 1508 from a first satellite 1506 and the spot beam 1512 from a second satellite 1510. Although only two satellites are used in this example, the following discussion is applicable to similar situations involving more than two satellites. In this example, the first satellite 1506 has Ka-band resources, and the second satellite 1510 has Q/V band resources. Although only one terminal 1500 is shown, it is assumed that terminals in the system include Ka-only capable terminals and multi-band capable terminals.

When the terminal 1500 is a Ka-only terminal, the terminal will always select the satellite that has Ka-band resources which, in this example, is the first satellite 1506. When the terminal 1500 is a multi-band terminal (e.g., Q/V-band capable and Ka-band capable), the terminal can select either of the satellites 1506, 1510 for operation to start and then switch between the satellites 1506, 1510 as needed during operation. A link adaptation process can be used to make switching decisions for the multi-band terminal. Typically, a multi-band terminal selects the satellite that supports Q-band (e.g., satellite 1510) to receive high throughput when the link margin allows for it. Then, when Q-band fades and service is impacted, the terminal can switch to the other satellite with Ka-band resources (e.g., satellite 1506).

In addition to switching between satellites for link adaptation purposes, a multi-band terminal can switch between multiple satellites for load balancing purposes. As mentioned above, the outroute load balancing algorithm can utilize separate load balancing sets (e.g., a surplus and a deficit set) for each frequency band used in a beam. The same load balancing algorithms described above can be used for load balancing across multiple satellites. For example, for load balancing across multiple satellites, each satellite can be treated as a separate load balancing set or all the satellites together can be treated as a single load balancing set. However, in this case, instead of switching a terminal between CROS within the same spot beam, the terminal is switched between satellites, e.g., by steering the antenna 1502 from one satellite to the other.

In mobility applications, in an overlapping area from two satellites, a terminal will switch to a satellite based on the frequency band of the beam and the band capabilities of the terminal. A Ka-only capable terminal will always switch to a beam of a satellite which supports Ka-band resource. A multi-band capable mobile terminal may switch to a beam from either satellite based on the current situation and which follows the same logic as described in the mobility section with the only difference is that frequency band change results in a satellite switch.

Figure 16:
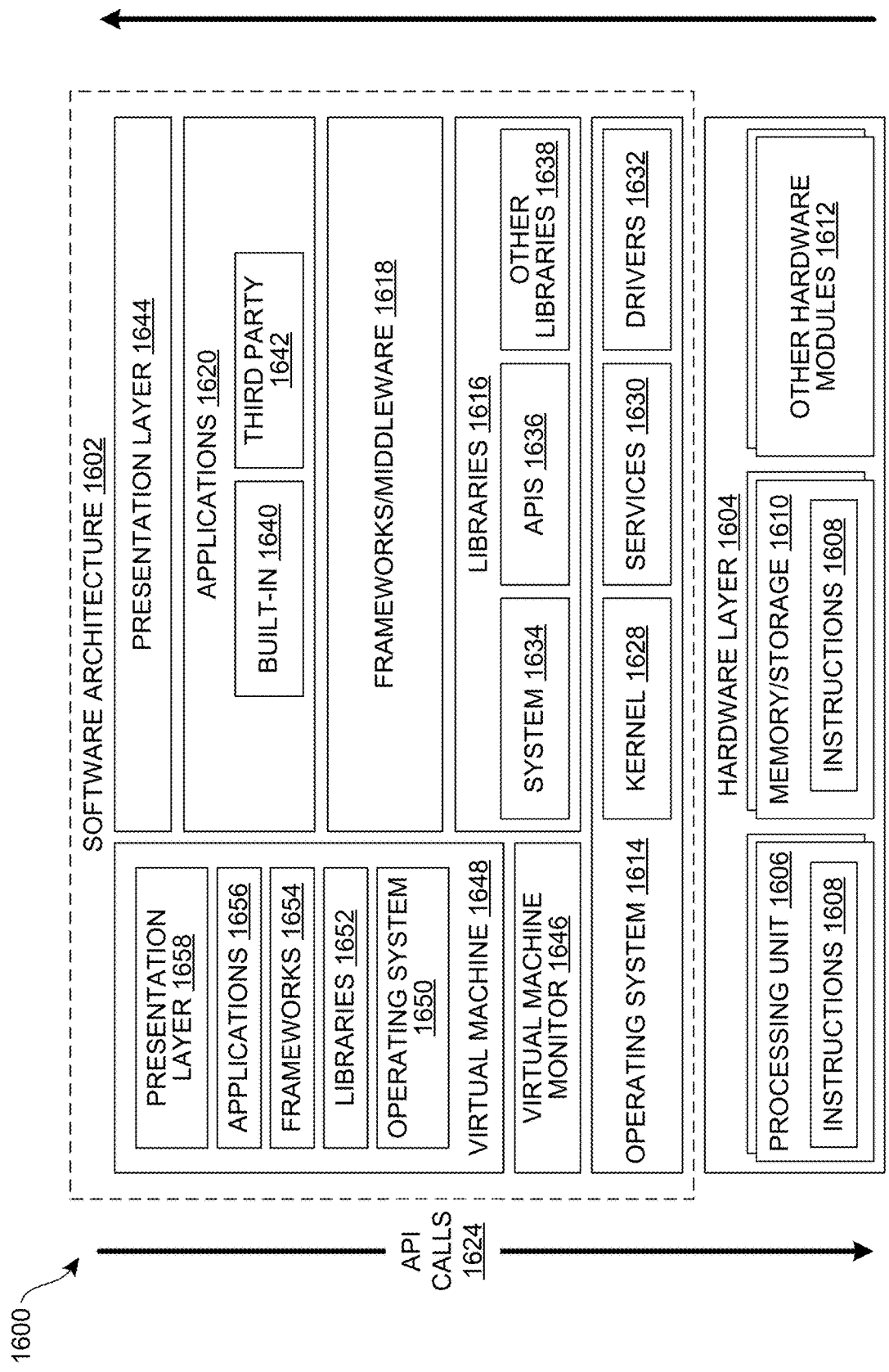
FIG. 16 is a block diagram of an example computing device, which may be used to provide implementations of the systems and methods described herein.

FIG. 16 is a block diagram 1600 illustrating an example software architecture 1602, various portions of which may be used in conjunction with various hardware architectures herein described, which may implement any of the above-described features. FIG. 16 is a non-limiting example of a software architecture and it will be appreciated that many other architectures may be implemented to facilitate the functionality described herein. The software architecture 1602 may execute on hardware such as the central processing unit 1606 that may include, among other things, document storage, processors, memory, and input/output (I/O) components. A representative hardware layer 1604 is illustrated and can represent, for example, the devices described herein. The representative hardware layer 1604 includes a processing unit 1606 and associated executable instructions 1608. The executable instructions 1608 represent executable instructions of the software architecture 1602, including implementation of the methods, modules and so forth described herein. The hardware layer 1604 also includes a memory/storage 1610, which also includes the executable instructions 1608 and accompanying data. The hardware layer 1604 may also include other hardware modules 1612. Instructions 1608 held by processing unit 1606 may be portions of instructions 1608 held by the memory/storage 1610.

The example software architecture 1602 may be conceptualized as layers, each providing various functionality. For example, the software architecture 1602 may include layers and components such as an operating system (OS) 1614, libraries 1616, frameworks 1618, applications 1620, and a presentation layer 1644. Operationally, the applications 1620 and/or other components within the layers may invoke API calls 1624 to other layers and receive corresponding results. The layers illustrated are representative in nature and other software architectures may include additional or different layers. For example, some mobile or special purpose operating systems may not provide the frameworks/middleware 1618.

The OS 1614 may manage hardware resources and provide common services. The OS 1614 may include, for example, a kernel 1628, services 1630, and drivers 1632. The kernel 1628 may act as an abstraction layer between the hardware layer 1604 and other software layers. For example, the kernel 1628 may be responsible for memory management, processor management (for example, scheduling), component management, networking, security settings, and so on. The services 1630 may provide other common services for the other software layers. The drivers 1632 may be responsible for controlling or interfacing with the underlying hardware layer 1604. For instance, the drivers 1632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1616 may provide a common infrastructure that may be used by the applications 1620 and/or other components and/or layers. The libraries 1616 typically provide functionality for use by other software modules to perform tasks, rather than rather than interacting directly with the OS 1614. The libraries 1616 may include system libraries 1634 (for example, C standard library) that may provide functions such as memory allocation, string manipulation, file operations. In addition, the libraries 1616 may include API libraries 1636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1616 may also include a wide variety of other libraries 1638 to provide many functions for applications 1620 and other software modules.

The frameworks 1618 (also sometimes referred to as middleware) provide a higher-level common infrastructure that may be used by the applications 1620 and/or other software modules. For example, the frameworks 1618 may provide various graphic user interface (GUI) functions, high-level resource management, or high-level location services. The frameworks 1618 may provide a broad spectrum of other APIs for applications 1620 and/or other software modules.

The applications 1620 include built-in applications 1640 and/or third-party applications 1642. Examples of built-in applications 1640 may include, but are not limited to, a contacts application, a browser application, a location application, a media application, a messaging application, and/or a game application. Third-party applications 1642 may include any applications developed by an entity other than the vendor of the particular platform. The applications 1620 may use functions available via OS 1614, libraries 1616, frameworks 1618, and presentation layer 1644 to create user interfaces to interact with users.

Some software architectures use virtual machines, as illustrated by a virtual machine 1648. The virtual machine 1648 provides an execution environment where applications/modules can execute as if they were executing on a hardware machine. The virtual machine 1648 may be hosted by a host OS (for example, OS 1614) or hypervisor, and may have a virtual machine monitor 1646 which manages operation of the virtual machine 1648 and interoperation with the host operating system. A software architecture, which may be different from software architecture 1602 outside of the virtual machine, executes within the virtual machine 1648 such as an OS 1650, libraries 1652, frameworks 1654, applications 1656, and/or a presentation layer 1658.

Figure 17:
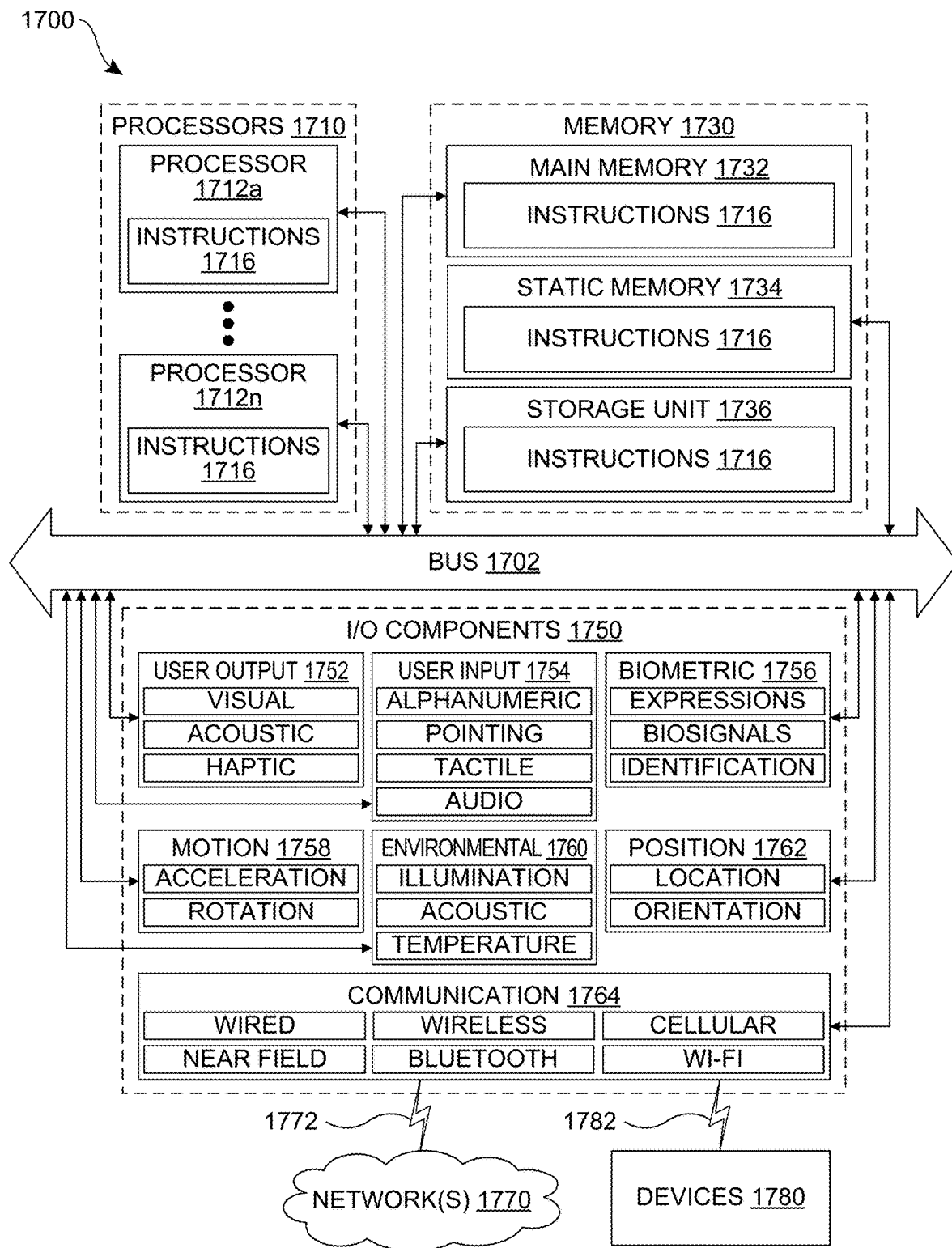
FIG. 17 is a block diagram illustrating components of an example machine configured to read instructions from a machine-readable medium.

FIG. 17 is a block diagram illustrating components of an example machine 1700 configured to read instructions from a machine-readable medium (for example, a machine-readable storage medium) and perform any of the features described herein. The example machine 1700 is in a form of a computer system, within which instructions 1716 (for example, in the form of software components) for causing the machine 1700 to perform any of the features described herein may be executed. As such, the instructions 1716 may be used to implement modules or components described herein. The instructions 1716 cause unprogrammed and/or unconfigured machine 1700 to operate as a particular machine configured to carry out the described features. The machine 1700 may be configured to operate as a standalone device or may be coupled (for example, networked) to other machines. In a networked deployment, the machine 1700 may operate in the capacity of a server machine or a client machine in a server-client network environment, or as a node in a peer-to-peer or distributed network environment. Machine 1700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IOT) device. Further, although only a single machine 1700 is illustrated, the term "machine" includes a collection of machines that individually or jointly execute the instructions 1716.

The machine 1700 may include processors 1710, memory 1730, and I/O components 1750, which may be communicatively coupled via, for example, a bus 1702. The bus 1702 may include multiple buses coupling various elements of machine 1700 via various bus technologies and protocols. In an example, the processors 1710 (including, for example, a central processing unit (CPU), a graphics processing unit (GPU), a digital signal processor (DSP), an ASIC, or a suitable combination thereof) may include one or more processors 1712a to 1712n that may execute the instructions 1716 and process data. In some examples, one or more processors 1710 may execute instructions provided or identified by one or more other processors 1710. The term "processor" includes a multi-core processor including cores that may execute instructions contemporaneously. Although FIG. 17 shows multiple processors, the machine 1700 may include a single processor with a single core, a single processor with multiple cores (for example, a multi-core processor), multiple processors each with a single core, multiple processors each with multiple cores, or any combination thereof. In some examples, the machine 1700 may include multiple processors distributed among multiple machines.

The memory/storage 1730 may include a main memory 1732, a static memory 1734, or other memory, and a storage unit 1736, both accessible to the processors 1710 such as via the bus 1702. The storage unit 1736 and memory 1732, 1734 store instructions 1716 embodying any one or more of the functions described herein. The memory/storage 1730 may also store temporary, intermediate, and/or long-term data for processors 1710. The instructions 1716 may also reside, completely or partially, within the memory 1732, 1734, within the storage unit 1736, within at least one of the processors 1710 (for example, within a command buffer or cache memory), within memory at least one of I/O components 1750, or any suitable combination thereof, during execution thereof. Accordingly, the memory 1732, 1734, the storage unit 1736, memory in processors 1710, and memory in I/O components 1750 are examples of machine-readable media.

As used herein, "machine-readable medium" refers to a device able to temporarily or permanently store instructions and data that cause machine 1700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1716) for execution by a machine 1700 such that the instructions, when executed by one or more processors 1710 of the machine 1700, cause the machine 1700 to perform and one or more of the features described herein. Accordingly, a "machine-readable medium" may refer to a single storage device, as well as "cloud-based" storage systems or storage networks that include multiple storage apparatus or devices.

The I/O components 1750 may include a wide variety of hardware components adapted to receive input, provide output, produce output, transmit information, exchange information, capture measurements, and so on. The specific I/O components 1750 included in a particular machine will depend on the type and/or function of the machine. For example, mobile devices such as mobile phones may include a touch input device, whereas a headless server or IoT device may not include such a touch input device. The particular examples of I/O components illustrated in FIG. 17 are in no way limiting, and other types of components may be included in machine 1700. The grouping of I/O components 1750 are merely for simplifying this discussion, and the grouping is in no way limiting. In various examples, the I/O components 1750 may include user output components 1752 and user input components 1754. User output components 1752 may include, for example, display components for displaying information (for example, a liquid crystal display (LCD) or a projector), acoustic components (for example, speakers), haptic components (for example, a vibratory motor or force-feedback device), and/or other signal generators. User input components 1754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1750 may include biometric components 1756, motion components 1758, environmental components 1760, and/or position components 1762, among a wide array of other possible sensor components. The biometric components 1756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The motion components may include, for example, acceleration and/or rotation sensors for various components of the 3D printer. The environmental components may include, for example, light sensors (for example, photodiodes, photoresistors, or phototransistors), acoustic sensors (for example, piezoelectric sensors or acoustic wave sensors), or temperature sensors (for example, thermocouples or thermistors), which may sense environmental conditions for various locations in the 3D printer. The position components 1762 may include, for example, location sensors (for example, a Global Position System (GPS) receiver), altitude sensors (for example, an air pressure sensor from which altitude may be derived), and/or orientation sensors (for example, magnetometers).

The I/O components 1750 may include communication components 1764, implementing a wide variety of technologies operable to couple the machine 1304 to network(s) 1770 and/or device(s) 1780 via respective communicative couplings 1772 and 1782. The communication components 1764 may include one or more network interface components or other suitable devices to interface with the network(s) 1770. The communication components 1764 may include, for example, components adapted to provide wired communication, wireless communication, cellular communication, Near Field Communication (NFC), Bluetooth communication, Wi-Fi, and/or communication via other modalities. The device(s) 1780 may include other machines or various peripheral devices (for example, coupled via USB).

In some examples, the communication components 1764 may detect identifiers or include components adapted to detect identifiers. For example, the communication components 1764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1764, such as, but not limited to, geo-location via Internet Protocol (IP) address, location via Wi-Fi, cellular, NFC, Bluetooth, or other wireless station identification and/or signal triangulation.

In the following, further features, characteristics and advantages of the instant application will be described by means of items:

Item 1. A data processing device for a load balancing system of a multi-band hybrid satellite communication system, the data processing device comprising:
a processor; and
a memory in communication with the processor, the memory comprising executable instructions that, when executed by the processor alone or in combination with other processors, cause the processor to perform functions of:
determining a current congestion level of code rate organizers (CROs) of the load balancing system;
determining a load metric of each of the CROs, the load metric that is determined being different for different congestion levels of the CROs;
comparing the load metric of each of the CROs to a threshold value;
when the load metric of a CRO is greater than the threshold value, placing the CRO in a surplus load balancing set;
when the load metric of the CRO is less than the threshold value, placing the CRO in a deficit load balancing set;
determining a probability metric for each satellite terminal associated with each of the CROs in the surplus load balancing set, the probability metric indicating a probability of the terminal moving to one of the CROs in the deficit load balancing set; and
causing at least one satellite terminal associated with one of the CROs in the surplus load balancing set to switch to one of the CROs in the deficit load balancing set based on the probability metric of the at least one satellite terminal.

Item 2. The data processing device of item 1, wherein the congestion level of a CRO is determined based on an average utilization of the CRO or average utilization of an outroute associated with the CRO.

Item 3. The data processing device of any of items 1-2, wherein the current congestion level is one of heavily congested, medium congested, and lightly congested, wherein, when the average utilization of the CRO or the average utilization of the outroute associated with the CRO is greater than a threshold value, the CRO is considered heavily congested, wherein, when the average utilization of the CRO or the average utilization of the outroute associated with the CRO is less than the threshold value and the average utilization of any individual CRO or the average utilization of the outroute associated with any individual CRO is greater than the threshold value, the CRO is considered medium congested, and wherein, when the average utilization of all CROs or the average utilization of the outroutes associated with all the CROs is less than the threshold value, the CROs are considered lightly congested.

Item 4. The data processing device of any of items 1-3, wherein, when the current congestion level of the CROs of the load balancing system is heavily congested, the load metric is a load ratio of each of the CROs, and wherein, when the congestion level is medium congested, the load metric is an active plan rate of each of the CROs.

Item 5. The data processing device of any of items 1-4, wherein the load balancing system performs load balancing of first frequency band resources and second frequency band resources separately, and wherein a first surplus load balancing set and a first deficit load balancing set are used for load balancing of the first frequency band resources and a second surplus load balancing set and a second deficit load balancing set are used load balancing of the second frequency band resources, wherein terminals of CROs in the first surplus loading balancing set are only allowed to switch to CROs in the first deficit load balancing set, and wherein terminals of CROs in the second surplus loading balancing set are only allowed to switch to CROs in the second deficit load balancing set.

Item 6. The data processing device of any of items 1-5, wherein the first frequency band resources are Ka-band resources and the second frequency band resources are Q-band resources, and wherein, when there are more Ka-only terminals than multi-band terminals, determining the probability metric for the satellite terminals includes determining the probability metric such that multi-band terminal movement is biased toward CROs associated with Q-band outroutes.

Item 7. The data processing device of any of items 1-6, further comprising:

determining an upper limit threshold for each of the CROs in the deficit load balancing set, the upper limit threshold for each of the CROs being determined based on a total plan rate density of each of the CROs, and wherein, when the total plan rate density of a CRO in the deficit load balancing set is greater than an average CRO plan rate density by a predetermined margin, the CRO in the deficit load balancing set is designated a non move-in CRO and terminals are not allowed to switch to the non move-in CRO.

Item 8. The data processing device of any of items 1-7, wherein, when the CROs are lightly congested, a terminal is not allowed to switch to another CRO when (i) a utilization of a CRO with which the terminal is associated is lower than an average CRO utilization of the CROs, (ii) a total plan rate density of the CRO with which the terminal is associated is less than or equal to an average CRO total plan rate density of the CROs, and (iii) any one of (a) a utilization of an Internet Protocol Gateway (IPGW) associated with the CRO for the terminal is less than equal to a first threshold, (b) an average utilization of all IPGWs connected with the CRO for the terminal is less than or equal to the first threshold, (c) an average utilization of IPGWs connected with the CRO for the terminal is less than or equal to an overall average IPGW utilization, and (d) a utilization of all IPGWs connected with the CRO for the terminal is greater than a second threshold, the second threshold being greater than the first threshold.

Item 9. A method for outroute load balancing in a multi-band hybrid satellite communication system, the method comprising:

determining a current congestion level of code rate organizers (CROs) of the load balancing system;

determining a load metric of each of the CROs, the load metric that is determined being different for different congestion levels of the CROs;

comparing the load metric of each of the CROs to a threshold value;

placing each CRO in one of a surplus load balancing set and a deficit balancing set based on a value of the load metric;

determining a probability metric for each satellite terminal associated with each of the CROs in the surplus load balancing set, the probability metric indicating a probability of the terminal moving to one of the CROs in the deficit load balancing set; and causing at least one satellite terminal associated with one of the CROs in the surplus load balancing set to switch to one of the CROs in the deficit load balancing set based on the probability metric of the at least one satellite terminal.

Item 10. The method of item 9, when the congestion level of a CRO is determined based on an average utilization of the CRO or average utilization of an outroute associated with the CRO.

Item 11. The method of any of items 9-10, wherein the current congestion level is one of heavily congested, medium congested, and lightly congested, wherein, when the average utilization of the CRO or the average utilization of the outroute associated with the CRO is greater than a threshold value, the CRO is considered heavily congested, wherein, when the average utilization of the CRO or the average utilization of the outroute associated with the CRO is less than the threshold value and the average utilization of any individual CRO or the average utilization of the outroute associated with any individual CRO is greater than the threshold value, the CRO is considered medium congested, and wherein, when the average utilization of all CROs or the average utilization of the outroutes associated with all the CROs is less than the threshold value, the CROs are considered lightly congested.

Item 12. The method of any of items 9-11, wherein, when the current congestion level of the CROs of the load balancing system is heavily congested, the load metric is a load ratio of each of the CROs, and wherein, when the congestion level is medium congested, the load metric is an active plan rate of each of the CROs.

Item 13. The method of any of items 9-12, wherein the load balancing system performs load balancing of first frequency band resources and second frequency band resources separately, and
  wherein a first surplus load balancing set and a first deficit load balancing set are used for load balancing of the first frequency band resources and a second surplus load balancing set and a second deficit load balancing set are used load balancing of the second frequency band resources,
  wherein terminals of CROs in the first surplus loading balancing set are only allowed to switch to CROs in the first deficit load balancing set, and
  wherein terminals of CROs in the second surplus loading balancing set are only allowed to switch to CROs in the second deficit load balancing set.

Item 14. The method of any of items 9-13, wherein the first frequency band resources are Ka-band resources and the second frequency band resources are Q-band resources, and
  wherein, when there are more Ka-only terminals than multi-band terminals, determining the probability metric for the satellite terminals includes determining the probability metric such that multi-band terminal movement is biased toward CROs associated with Q-band outroutes.

Item 15. The method of any of items 9-14, further comprising:
  determining an upper limit threshold for each of the CROs in the deficit load balancing set, the upper limit threshold for each of the CROs being determined based on a total plan rate density of each of the CROs, and
  wherein, when the total plan rate density of a CRO in the deficit load balancing set is greater than an average CRO plan rate density by a predetermined margin, the CRO in the deficit load balancing set is designated a non move-in CRO and terminals are not allowed to switch to the non move-in CRO.

Item 16. The method of any of items 9-15, wherein, when the CROs are lightly congested, a terminal is not allowed to switch to another CRO when (i) a utilization of a CRO with which the terminal is associated is lower than an average CRO utilization of the CROs, (ii) a total plan rate density of the CRO with which the terminal is associated is less than or equal to an average CRO total plan rate density of the CROs, and (iii) any one of (a) a utilization of an Internet Protocol Gateway (IPGW) associated with the CRO for the terminal is less than equal to a first threshold, (b) an average utilization of all IPGWs connected with the CRO for the terminal is less than or equal to the first threshold, (c) an average utilization of IPGWs connected with the CRO for the terminal is less than or equal to an overall average IPGW utilization, and (d) a utilization of all IPGWs connected with the CRO for the terminal is greater than a second threshold, the second threshold being greater than the first threshold.

Item 17. A non-transitory computer readable medium on which are stored instructions that, when executed, cause a programmable device to perform functions of:
  determining a current congestion level of code rate organizers (CROs) of a load balancing system;
  determining a load metric of each of the CROs, the load metric that is determined being different for different congestion levels of the CROs;
  comparing the load metric of each of the CROs to a threshold value;
  when the load metric of a CRO is greater than the threshold value, placing the CRO in a surplus load balancing set;
  when the load metric of the CRO is less than the threshold value, placing the CRO in a deficit load balancing set;
  determining a probability metric for each satellite terminal associated with each of the CROs in the surplus load balancing set, the probability metric indicating a probability of the terminal moving to one of the CROs in the deficit load balancing set; and
  causing at least one satellite terminal associated with one of the CROs in the surplus load balancing set to switch to one of the CROs in the deficit load balancing set based on the probability metric of the at least one satellite terminal.

Item 18. The non-transitory computer readable medium of item 17, wherein the congestion level of a CRO is determined based on an average utilization of the CRO or average utilization of an outroute associated with the CRO.

Item 19. The non-transitory computer readable medium of any of items 17-18, wherein the current congestion level is one of heavily congested, medium congested, and lightly congested,
  wherein, when the average utilization of the CRO or the average utilization of the outroute associated with the CRO is greater than a threshold value, the CRO is considered heavily congested,
  wherein, when the average utilization of the CRO or the average utilization of the outroute associated with the CRO is less than the threshold value and the average utilization of any individual CRO or the average utilization of the outroute associated with any individual CRO is greater than the threshold value, the CRO is considered medium congested, and
  wherein, when the average utilization of all CROs or the average utilization of the outroutes associated with all the CROs is less than the threshold value, the CROs are considered lightly congested.

Item 20. The non-transitory computer readable medium of any of items 17-19, wherein the load balancing system performs load balancing of first frequency band resources and second frequency band resources separately, and
  wherein a first surplus load balancing set and a first deficit load balancing set are used for load balancing of the first frequency band resources and a second surplus load balancing set and a second deficit load balancing set are used load balancing of the second frequency band resources,
  wherein terminals of CROs in the first surplus loading balancing set are only allowed to switch to CROs in the first deficit load balancing set, and
  wherein terminals of CROs in the second surplus loading balancing set are only allowed to switch to CROs in the second deficit load balancing set.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing device for a load balancing system of a multi-band hybrid satellite communication system, the data processing device comprising:
a processor; and
a memory in communication with the processor, the memory comprising executable instructions that, when executed by the processor alone or in combination with other processors, cause the processor to perform functions of:
determining a current congestion level of code rate organizers (CROs) of the load balancing system;
determining a load metric of each of the CROs, the load metric that is determined being different for different congestion levels of the CROs;
comparing the load metric of each of the CROs to a threshold value;
when the load metric of a CRO is greater than the threshold value, placing the CRO in a surplus load balancing set;
when the load metric of the CRO is less than the threshold value, placing the CRO in a deficit load balancing set;
determining a probability metric for each satellite terminal associated with each of the CROs in the surplus load balancing set, the probability metric indicating a probability of the terminal moving to one of the CROs in the deficit load balancing set; and
causing at least one satellite terminal associated with one of the CROs in the surplus load balancing set to switch to one of the CROs in the deficit load balancing set based on the probability metric of the at least one satellite terminal.

2. The data processing device of claim 1, wherein the congestion level of a CRO is determined based on an average utilization of the CRO or average utilization of an outroute associated with the CRO.

3. The data processing device of claim 2, wherein the current congestion level is one of heavily congested, medium congested, and lightly congested,
wherein, when the average utilization of the CRO or the average utilization of the outroute associated with the CRO is greater than a threshold value, the CRO is considered heavily congested,
wherein, when the average utilization of the CRO or the average utilization of the outroute associated with the CRO is less than the threshold value and the average utilization of any individual CRO or the average utilization of the outroute associated with any individual CRO is greater than the threshold value, the CRO is considered medium congested, and wherein, when the average utilization of all CROs or the average utilization of the outroutes associated with all the CROs is less than the threshold value, the CROs are considered lightly congested.

4. The data processing device of claim 3, wherein, when the current congestion level of the CROs of the load balancing system is heavily congested, the load metric is a load ratio of each of the CROs, and wherein, when the congestion level is medium congested, the load metric is an active plan rate of each of the CROs.

5. The data processing device of claim 1, wherein the load balancing system performs load balancing of first frequency band resources and second frequency band resources separately, and wherein a first surplus load balancing set and a first deficit load balancing set are used for load balancing of the first frequency band resources and a second surplus load balancing set and a second deficit load balancing set are used load balancing of the second frequency band resources, wherein terminals of CROs in the first surplus loading balancing set are only allowed to switch to CROs in the first deficit load balancing set, and wherein terminals of CROs in the second surplus loading balancing set are only allowed to switch to CROs in the second deficit load balancing set.

6. The data processing device of claim 5, wherein the first frequency band resources are Ka-band resources and the second frequency band resources are Q-band resources, and wherein, when there are more Ka-only terminals than multi-band terminals, determining the probability metric for the satellite terminals includes determining the probability metric such that multi-band terminal movement is biased toward CROs associated with Q-band outroutes.

7. The data processing device of claim 1, further comprising:

determining an upper limit threshold for each of the CROs in the deficit load balancing set, the upper limit threshold for each of the CROs being determined based on a total plan rate density of each of the CROs, and wherein, when the total plan rate density of a CRO in the deficit load balancing set is greater than an average CRO plan rate density by a predetermined margin, the CRO in the deficit load balancing set is designated a non move-in CRO and terminals are not allowed to switch to the non move-in CRO.

8. The data processing device of claim 3, wherein, when the CROs are lightly congested, a terminal is not allowed to switch to another CRO when (i) a utilization of a CRO with which the terminal is associated is lower than an average CRO utilization of the CROs, (ii) a total plan rate density of the CRO with which the terminal is associated is less than or equal to an average CRO total plan rate density of the CROs, and (iii) any one of (a) a utilization of an Internet Protocol Gateway (IPGW) associated with the CRO for the terminal is less than equal to a first threshold, (b) an average utilization of all IPGWs connected with the CRO for the terminal is less than or equal to the first threshold, (c) an average utilization of IPGWs connected with the CRO for the terminal is less than or equal to an overall average IPGW utilization, and (d) a utilization of all IPGWs connected with the CRO for the terminal is greater than a second threshold, the second threshold being greater than the first threshold.

9. A method for outroute load balancing in a multi-band hybrid satellite communication system, the method comprising:

determining a current congestion level of code rate organizers (CROs) of the load balancing system;

determining a load metric of each of the CROs, the load metric that is determined being different for different congestion levels of the CROs;

comparing the load metric of each of the CROs to a threshold value;

placing each CRO in one of a surplus load balancing set and a deficit balancing set based on a value of the load metric;

determining a probability metric for each satellite terminal associated with each of the CROs in the surplus load balancing set, the probability metric indicating a probability of the terminal moving to one of the CROs in the deficit load balancing set; and causing at least one satellite terminal associated with one of the CROs in the surplus load balancing set to switch to one of the CROs in the deficit load balancing set based on the probability metric of the at least one satellite terminal.

10. The method of claim 9, when the congestion level of a CRO is determined based on an average utilization of the CRO or average utilization of an outroute associated with the CRO.

11. The method of claim 10, wherein the current congestion level is one of heavily congested, medium congested, and lightly congested, wherein, when the average utilization of the CRO or the average utilization of the outroute associated with the CRO is greater than a threshold value, the CRO is considered heavily congested, wherein, when the average utilization of the CRO or the average utilization of the outroute associated with the CRO is less than the threshold value and the average utilization of any individual CRO or the average utilization of the outroute associated with any individual CRO is greater than the threshold value, the CRO is considered medium congested, and wherein, when the average utilization of all CROs or the average utilization of the outroutes associated with all the CROs is less than the threshold value, the CROs are considered lightly congested.

12. The method of claim 11, wherein, when the current congestion level of the CROs of the load balancing system is heavily congested, the load metric is a load ratio of each of the CROs, and wherein, when the congestion level is medium congested, the load metric is an active plan rate of each of the CROs.

13. The method of claim 9, wherein the load balancing system performs load balancing of first frequency band resources and second frequency band resources separately, and wherein a first surplus load balancing set and a first deficit load balancing set are used for load balancing of the first frequency band resources and a second surplus load balancing set and a second deficit load balancing set are used load balancing of the second frequency band resources, wherein terminals of CROs in the first surplus loading balancing set are only allowed to switch to CROs in the first deficit load balancing set, and wherein terminals of CROs in the second surplus loading balancing set are only allowed to switch to CROs in the second deficit load balancing set.

14. The method of claim 13, wherein the first frequency band resources are Ka-band resources and the second frequency band resources are Q-band resources, and
wherein, when there are more Ka-only terminals than multi-band terminals, determining the probability metric for the satellite terminals includes determining the probability metric such that multi-band terminal movement is biased toward CROs associated with Q-band outroutes.

15. The method of claim 9, further comprising:
determining an upper limit threshold for each of the CROs in the deficit load balancing set, the upper limit threshold for each of the CROs being determined based on a total plan rate density of each of the CROs, and
wherein, when the total plan rate density of a CRO in the deficit load balancing set is greater than an average CRO plan rate density by a predetermined margin, the CRO in the deficit load balancing set is designated a non move-in CRO and terminals are not allowed to switch to the non move-in CRO.

16. The method of claim 11, wherein, when the CROs are lightly congested, a terminal is not allowed to switch to another CRO when (i) a utilization of a CRO with which the terminal is associated is lower than an average CRO utilization of the CROs, (ii) a total plan rate density of the CRO with which the terminal is associated is less than or equal to an average CRO total plan rate density of the CROs, and (iii) any one of (a) a utilization of an Internet Protocol Gateway (IPGW) associated with the CRO for the terminal is less than equal to a first threshold, (b) an average utilization of all IPGWs connected with the CRO for the terminal is less than or equal to the first threshold, (c) an average utilization of IPGWs connected with the CRO for the terminal is less than or equal to an overall average IPGW utilization, and (d) a utilization of all IPGWs connected with the CRO for the terminal is greater than a second threshold, the second threshold being greater than the first threshold.

17. A non-transitory computer readable medium on which are stored instructions that, when executed, cause a programmable device to perform functions of:
determining a current congestion level of code rate organizers (CROs) of a load balancing system;
determining a load metric of each of the CROs, the load metric that is determined being different for different congestion levels of the CROs;
comparing the load metric of each of the CROs to a threshold value;
when the load metric of a CRO is greater than the threshold value, placing the CRO in a surplus load balancing set;
when the load metric of the CRO is less than the threshold value, placing the CRO in a deficit load balancing set;
determining a probability metric for each satellite terminal associated with each of the CROs in the surplus load balancing set, the probability metric indicating a probability of the terminal moving to one of the CROs in the deficit load balancing set; and
causing at least one satellite terminal associated with one of the CROs in the surplus load balancing set to switch to one of the CROs in the deficit load balancing set based on the probability metric of the at least one satellite terminal.

18. The non-transitory computer readable medium of claim 17, wherein the congestion level of a CRO is determined based on an average utilization of the CRO or average utilization of an outroute associated with the CRO.

19. The non-transitory computer readable medium of claim 18, wherein the current congestion level is one of heavily congested, medium congested, and lightly congested,
wherein, when the average utilization of the CRO or the average utilization of the outroute associated with the CRO is greater than a threshold value, the CRO is considered heavily congested,
wherein, when the average utilization of the CRO or the average utilization of the outroute associated with the CRO is less than the threshold value and the average utilization of any individual CRO or the average utilization of the outroute associated with any individual CRO is greater than the threshold value, the CRO is considered medium congested, and
wherein, when the average utilization of all CROs or the average utilization of the outroutes associated with all the CROs is less than the threshold value, the CROs are considered lightly congested.

20. The non-transitory computer readable medium of claim 17, wherein the load balancing system performs load balancing of first frequency band resources and second frequency band resources separately, and
wherein a first surplus load balancing set and a first deficit load balancing set are used for load balancing of the first frequency band resources and a second surplus load balancing set and a second deficit load balancing set are used load balancing of the second frequency band resources,
wherein terminals of CROs in the first surplus loading balancing set are only allowed to switch to CROs in the first deficit load balancing set, and
wherein terminals of CROs in the second surplus loading balancing set are only allowed to switch to CROs in the second deficit load balancing set.

* * * * *